United States Patent
Kim et al.

(10) Patent No.: US 10,448,107 B2
(45) Date of Patent: Oct. 15, 2019

(54) DISPLAY DEVICE

(71) Applicant: LG ELECTRONICS INC, Seoul (KR)

(72) Inventors: Sungeun Kim, Seoul (KR); Hyeryoung Jeong, Seoul (KR); Changhoe Kim, Seoul (KR); Donghee Lee, Seoul (KR); Woojin Choi, Seoul (KR); Eunkyung Jung, Seoul (KR); Hyokak Kim, Seoul (KR); Changhoon Kim, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 15/618,652

(22) Filed: Jun. 9, 2017

(65) Prior Publication Data
US 2018/0139502 A1 May 17, 2018

(30) Foreign Application Priority Data

Nov. 11, 2016 (KR) .................. 10-2016-0150136
Nov. 14, 2016 (KR) .................. 10-2016-0151141

(51) Int. Cl.
| H04N 21/466 | (2011.01) |
| G06K 9/32 | (2006.01) |
| H04N 21/438 | (2011.01) |
| H04N 21/442 | (2011.01) |
| H04N 21/454 | (2011.01) |
| H04N 21/482 | (2011.01) |

(Continued)

(52) U.S. Cl.
CPC ..... *H04N 21/4667* (2013.01); *G06K 9/00744* (2013.01); *G06K 9/3266* (2013.01); *H04N 21/4383* (2013.01); *H04N 21/44008* (2013.01); *H04N 21/44204* (2013.01); *H04N 21/454* (2013.01); *H04N 21/4668* (2013.01); *H04N 21/4722* (2013.01); *H04N 21/4821* (2013.01); *H04N 21/6175* (2013.01); *H04N 21/64322* (2013.01); *H04N 21/6582* (2013.01); *H04N 21/8133* (2013.01)

(58) Field of Classification Search
USPC .......................................... 725/40
See application file for complete search history.

(56) References Cited

U.S. PATENT DOCUMENTS 6,622,307 B1 * 9/2003 Ho .................. H04N 7/104
                                                348/E7.05
7,814,524 B2 * 10/2010 Candelore .......... H04N 5/44543
                                                715/716

(Continued)

FOREIGN PATENT DOCUMENTS

EP          2603010 A2    6/2013
KR    10-2008-0028620 A   4/2008
(Continued)

*Primary Examiner* — An Son P Huynh
(74) *Attorney, Agent, or Firm* — Dentons US LLP

(57) ABSTRACT

A display device includes a display unit, an external device interface unit configured to receive an image signal from a set-top box connected to the display device, and a control unit configured to, if a broadcast channel is changed, display a broadcast image of the changed broadcast channel based on the image signal received from the set-top box, to recognize the channel number of the broadcast image by using the displayed broadcast image, and to display broadcasting information related to the recognized channel number on the display unit.

9 Claims, 21 Drawing Sheets

(51) Int. Cl.
*H04N 21/61* (2011.01)
*H04N 21/643* (2011.01)
*H04N 21/81* (2011.01)
*H04N 21/44* (2011.01)
*H04N 21/4722* (2011.01)
*H04N 21/658* (2011.01)
*G06K 9/00* (2006.01)

(56) References Cited

U.S. PATENT DOCUMENTS

| | | | |
|---|---|---|---|
| 8,681,277 B2 | 3/2014 | Jeong et al. | |
| 9,032,470 B2* | 5/2015 | Meuninck | H04N 13/0282 725/133 |
| 9,204,199 B2 | 12/2015 | Jeong et al. | |
| 9,510,044 B1* | 11/2016 | Pereira | H04N 21/44008 |
| 9,525,910 B2 | 12/2016 | Lee et al. | |
| 9,807,344 B2* | 10/2017 | Hines | H04N 7/157 |
| 2005/0114901 A1* | 5/2005 | Yui | H04N 7/163 725/100 |
| 2006/0187358 A1* | 8/2006 | Lienhart | G06F 17/30802 348/661 |
| 2007/0192782 A1* | 8/2007 | Ramaswamy | H04H 60/37 725/9 |
| 2008/0022352 A1* | 1/2008 | Seo | H04N 5/45 725/142 |
| 2008/0127253 A1* | 5/2008 | Zhang | H04N 21/478 725/35 |
| 2008/0199150 A1* | 8/2008 | Candelore | H04N 7/163 386/241 |
| 2009/0177758 A1* | 7/2009 | Banger | G06F 17/30781 709/219 |
| 2010/0154023 A1* | 6/2010 | Dey | H04N 21/4147 725/151 |
| 2010/0192181 A1* | 7/2010 | Friedman | H04N 5/4403 725/44 |
| 2011/0069940 A1* | 3/2011 | Shimy | G11B 27/105 386/296 |
| 2011/0099571 A1* | 4/2011 | Lucas | H04N 21/40 725/19 |
| 2011/0167447 A1* | 7/2011 | Wong | H04N 21/42208 725/40 |
| 2011/0234908 A1* | 9/2011 | Hsu | H04N 21/4312 348/569 |
| 2011/0282906 A1* | 11/2011 | Wong | G06F 17/30831 707/780 |
| 2012/0099795 A1* | 4/2012 | Jojic | G06K 9/3266 382/199 |
| 2012/0304229 A1* | 11/2012 | Choi | H04N 21/8173 725/41 |
| 2013/0027613 A1* | 1/2013 | Kim | H04N 21/4126 348/563 |
| 2013/0031582 A1* | 1/2013 | Tinsman | H04N 21/2353 725/36 |
| 2013/0173765 A1* | 7/2013 | Korbecki | H04N 21/42209 709/221 |
| 2013/0232517 A1 | 9/2013 | Reis dos Santos | |
| 2014/0245354 A1* | 8/2014 | Kunkel | H04N 5/44543 725/44 |
| 2015/0281765 A1* | 10/2015 | Lee | H04N 21/8133 725/32 |
| 2015/0289002 A1* | 10/2015 | Choi | H04N 21/23418 725/19 |
| 2016/0094868 A1* | 3/2016 | Singhal | H04N 21/44008 725/38 |
| 2016/0227297 A1* | 8/2016 | Bennett | H04N 21/812 |
| 2017/0094343 A1* | 3/2017 | Greene | H04N 21/4334 |
| 2017/0180795 A1* | 6/2017 | Cremer | H04N 21/23418 |

FOREIGN PATENT DOCUMENTS

| | | |
|---|---|---|
| KR | 10-2009-0027905 A | 3/2009 |
| KR | 10-2015-0078229 A | 7/2015 |
| WO | WO-2015188670 A1 * 12/2015 | ....... H04N 21/41407 |

* cited by examiner

1500

| INFORMATION OF SET-TOP BOX |
| INFORMATION ON COORDINATES OF FINAL CANDIDATE GROUP |
| CHANNEL CHANGE TIME |
| BANNER OUTPUT TIME POINT |

| TYPE OF STB | Position1 | Position2 | Banner Time | Version | Channel number Recognition algorithm type |
|---|---|---|---|---|---|
| A | (X,Y,W,H) | (X,Y,W,H) | 2 Sec | v1.0 | 1 |
| B | (X,Y,W,H) | (X,Y,W,H) | 2 Sec | v1.2 | 2 |
| C | (X,Y,W,H) | (X,Y,W,H) | 3 Sec | v.20 | 1 |
| D | (X,Y,W,H) | (X,Y,W,H) | 1 Sec | v1.3 | 2 |
| E | (X,Y,W,H) | (X,Y,W,H) | 2.5 Sec | v3.3 | 1 |

2210  2220  2230  2240  2250  2260

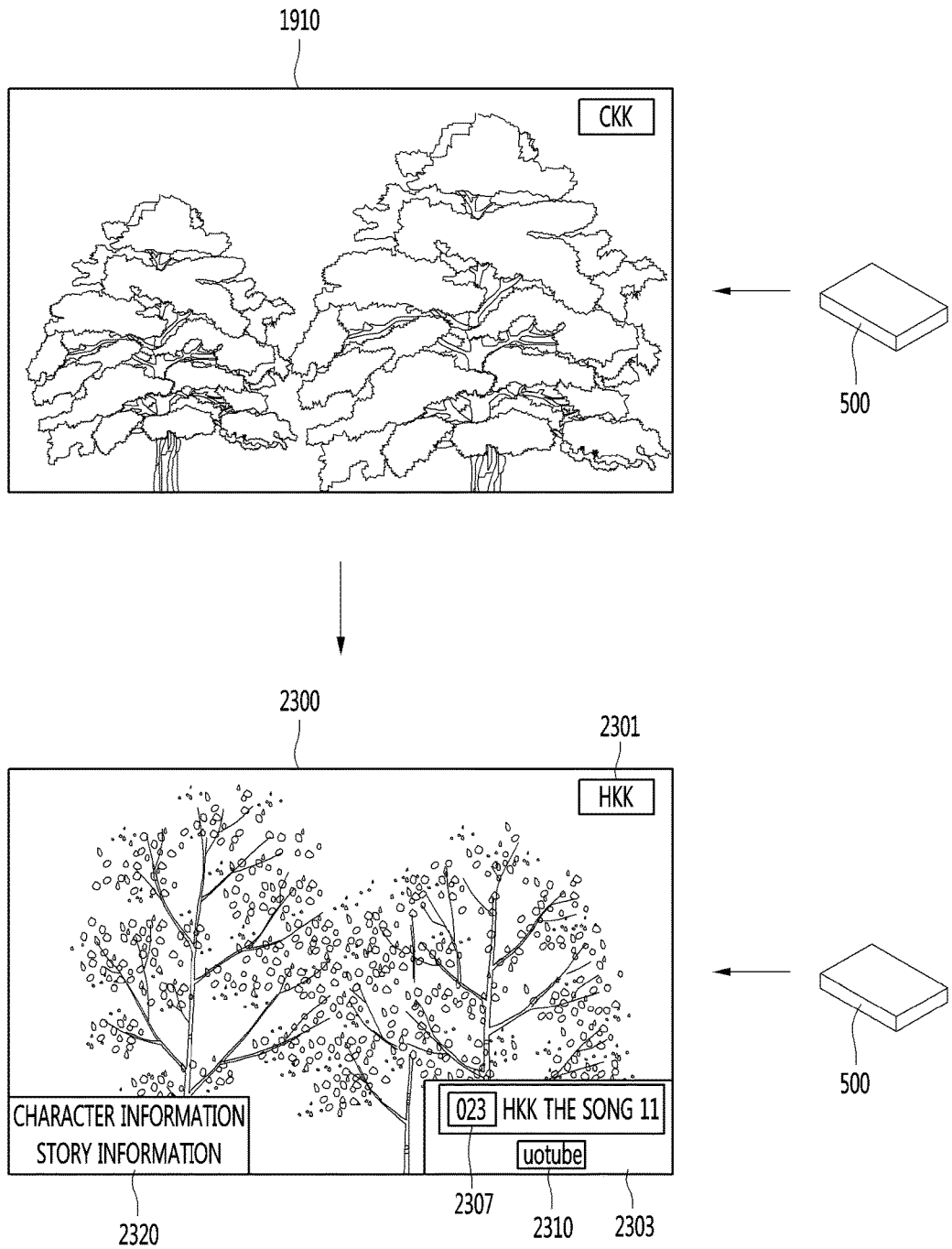

DISPLAY DEVICE

CROSS-REFERENCE TO RELATED APPLICATIONS

This application claims priority under 35 U.S.C. 119 and 365 to Korean Patent Application No. 10-2016-0150136, filed on Nov. 11, 2016 and Korean Patent Application No. 10-2016-0151141, filed on Nov. 14, 2016 in the Korean Intellectual Property Office, the disclosure of which is incorporated herein by reference.

BACKGROUND

The present disclosure relates to a display device, and more particularly, to a display device capable of recognizing a channel number of a broadcast program if a user watches the broadcast program provided from a set-top box connected to the display device.

Digital TV services using a wired or wireless communication network have become common. The digital TV service can provide various services that could not be provided in an existing analog broadcast service.

For example, an Internet Protocol Television (IPTV) or a smart TV service, which is a type of a digital TV service, provides a bi-directional service that allows a user to actively select a type of a program to be watched, a watching time, and the like. The IPTV or the smart TV service may provide various additional services based on the bi-directionality, for example, Internet browsing, home shopping, online games, and the like.

Such an existing TV may be connected to the set-top box to provide a broadcast program input from the set-top box.

However, the existing TV can acquire Electronic Program Guide (EPG) information from the set-top box, but a user cannot know a channel number of a broadcast program that the user is watching.

Since the existing TV cannot know the channel number of the broadcast program, the existing TV cannot recommend another channel to the user or provide information on channels of broadcast programs.

Therefore, the user could not use functions associated with channels or broadcast programs provided by the TV by using only a remote control device without using a remote control device of the TV.

SUMMARY

Embodiments of the present disclosure provide a display device capable of recognizing a channel number of a broadcast program provided from a set-top box connected to the display device.

Embodiments of the present disclosure recognize a channel number of a broadcast program provided from a set-top box and provide a user with broadcasting information associated with the channel number.

In one embodiment, a display device includes: a display unit; an external device interface unit configured to receive an image signal from a set-top box connected to the display device; and a control unit configured to, if a broadcast channel is changed, display a broadcast image of the changed broadcast channel based on the image signal received from the set-top box, to recognize the channel number of the broadcast image by using the displayed broadcast image, and to display broadcasting information related to the recognized channel number on the display unit.

In another embodiment, a display device includes: a display unit; an external device interface unit configured to receive a broadcast image from a set-top box connected to the display device; a storage unit configured to store position information of a channel number corresponding to the set-top box; and a control unit configured to, if a broadcast channel is changed, recognize the channel number based on the stored position information of the channel number and display broadcasting information related to the recognized channel number on the display unit.

BRIEF DESCRIPTION OF THE DRAWINGS

FIG. 22 is a view for describing a database established using set-top box information collected from a plurality of display devices, according to an embodiment of the present disclosure.

FIG. 23 is a view for describing an example of recognizing a channel number of an on-air broadcast program and providing associated broadcasting information, according to another embodiment of the present disclosure.

DETAILED DESCRIPTION OF THE EMBODIMENTS

Hereinafter, embodiments relating to the present disclosure will be described in detail with reference to the accompanying drawings. The suffixes "module" and "unit" for components used in the description below are assigned or mixed in consideration of easiness in writing the specification and do not have distinctive meanings or roles by themselves.

A display device according to an embodiment, for example, as an intelligent display device having both of the broadcast reception function and the computer assisted function, may include more convenient user-friendly interface than a handwriting input device, a touch screen or space remote control device, and the like, by adding an Internet function while fulfilling a broadcasting receiving function. With the support of a wired or wireless Internet function, the display device can connect to the Internet and computers and perform functions such as e-mail, web browsing, banking, or games. In order to perform such various functions, standardized general-purpose OS can be used.

Accordingly, since various applications are freely added or deleted on a general purpose OS kernel, a display device described herein can perform various user-friendly functions. More specifically, the display device may be, for example, a network TV, a Hybrid Broadcast Broadband TV (HBBTV), a smart TV, a light-emitting diode (LED) TV, an organic light-emitting diode (OLED) TV, and so on, and may be applied to a smartphone in some cases.

Figure 1:
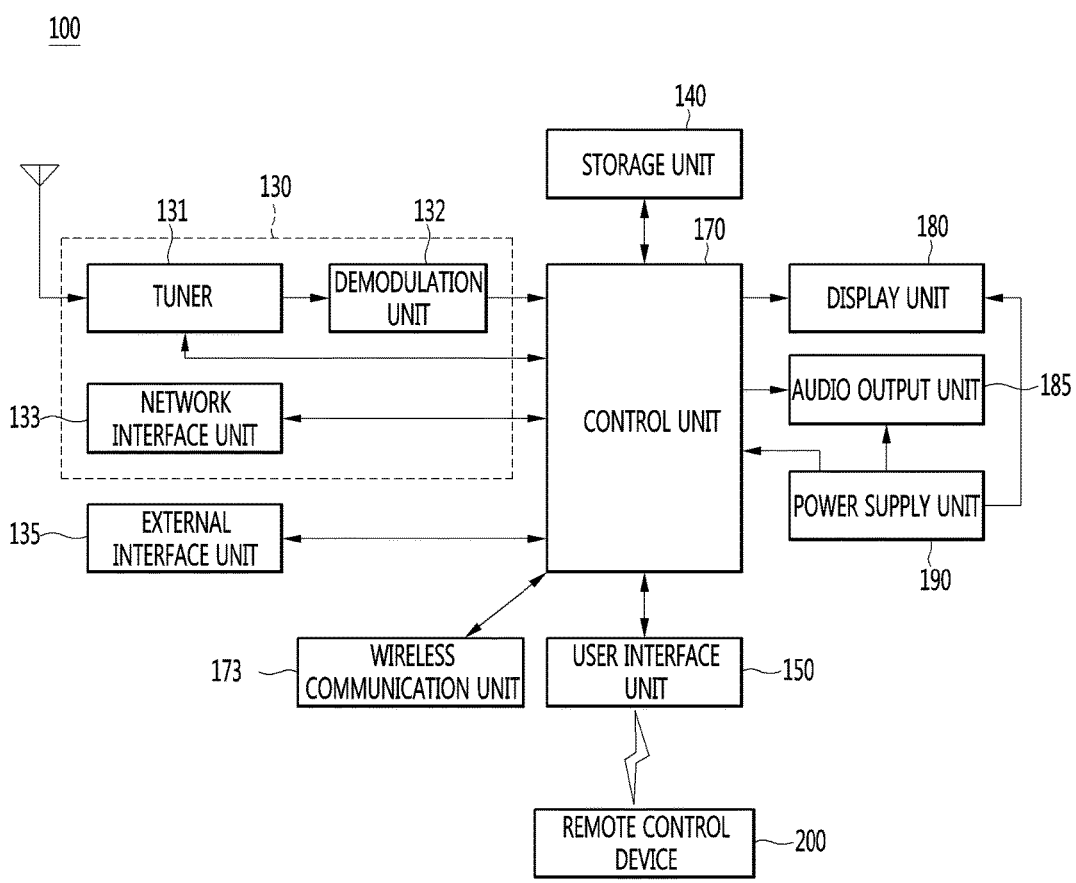
FIG. 1 is a block diagram illustrating a configuration of a display device according to an embodiment of the present disclosure.

FIG. 1 is a block diagram illustrating a configuration of a display device according to an embodiment of the present disclosure.

Referring to FIG. 1, the display device 100 may include a broadcast reception unit 130, an external device interface unit 135, a storage unit 140, a user input interface unit 150, a control unit 170, a wireless communication unit 173, a display unit 180, an audio output unit 185, and a power supply unit 190.

The broadcast reception unit 130 may include a tuner 131, a demodulation unit 132, and a network interface unit 133.

The tuner 131 may select a specific broadcast channel according to a channel selection command. The tuner 131 may receive broadcast signals for the selected specific broadcast channel.

The demodulation unit 132 may divide the received broadcast signals into video signals, audio signals, and broadcast program related data signals and restore the divided video signals, audio signals, and data signals to an output available form.

The external device interface unit 135 may receive an application or an application list of an adjacent external device and transfer the application or the application list to the control unit 170 or the storage unit 140.

The external device interface unit 135 may provide a connection path between the display device 100 and an external device. The external device interface unit 135 may receive at least one of image and audio output from an external device that is wirelessly or wiredly connected to the display device 100 and deliver it to the control unit 170. The external device interface unit 135 may include a plurality of external input terminals. The plurality of external input terminals may include an RGB terminal, at least one High Definition Multimedia Interface (HDMI) terminal, and a component terminal.

An image signal of an external device input through the external device interface unit 135 may be output through the display unit 180. A sound signal of an external device input through the external device interface unit 135 may be output through the audio output unit 185.

An external device connectable to the external device interface unit 135 may be one of a set-top box, a Blu-ray player, a DVD player, a game console, a sound bar, a smartphone, a PC, a USB memory, and a home theater system, but these are just exemplary.

The network interface unit 133 may provide an interface for connecting the display device 100 to a wired/wireless network including the Internet network. The network interface unit 133 may transmit or receive data to or from another user or another electronic device through an accessed network or another network linked to the accessed network.

Additionally, the network interface unit 133 may transmit a part of content data stored in the display device 100 to a user or an electronic device selected from other users or other electronic devices preregistered in the display device 100.

The network interface unit 133 may access a predetermined webpage through an accessed network or another network linked to the accessed network. That is, the network interface unit 133 may access the predetermined webpage through the network and transmit or receive data to or from a corresponding server.

The network interface unit 133 may receive content or data provided by a content provider or a network operator. That is, the network interface unit 133 may receive content (e.g., movies, advertisements, games, VOD, broadcast signals, etc.) and content-related information provided by the content provider or the network operator through the network.

Additionally, the network interface unit 133 may receive update information and update files of firmware provided by the network operator and may transmit data to the Internet or content provider or the network operator.

The network interface unit 133 may select and receive a desired application among applications, which are open to the public, through the network.

The storage unit 140 may store a program for signal processing and control in the control unit 170 and may store signal-processed image, voice, or data signals.

Additionally, the storage unit 140 may perform a function for temporarily storing images, voices, or data signals input from the external device interface unit 135 or the network interface unit 133 and may store information on a predetermined image through a channel memory function.

The storage unit 140 may store an application or an application list input from the external device interface unit 135 or the network interface unit 133.

The display device 100 may play content files (e.g., moving image files, still image files, music files, document files, application files, etc.) stored in the storage unit 140 so as to provide the content files to the user.

The user input interface unit 150 may transfer signals input by the user to the control unit 170 or may transfer signals from the control unit 170 to the user. For example, the user input interface unit 150 may process control signals for power on/off, channel selection, screen setting, or the like, which is received from the remote control device 200, or transmit the control signals from the control unit 170 to the remote control device 200, according to various communication schemes such as Bluetooth scheme, an Ultra Wideband (WB) scheme, a ZigBee scheme, a Radio Frequency (RF) communication scheme, or an infrared (IR) communication scheme.

Additionally, the user input interface unit 150 may transfer, to the control unit 170, control signals input from local keys (not shown) such as a power key, a channel key, a volume key, and a setting key.

Image signals that are image-processed by the control unit 170 may be input to the display unit 180 and displayed as an image corresponding to the image signals. Additionally, image signals that are image-processed by the control unit 170 may be input to an external output device through the external device interface unit 135.

Voice signals that are processed by the control unit 170 may be output to the audio output unit 185. Additionally, voice signals that are processed by the control unit 170 may be input to an external output device through the external device interface unit 135.

In addition, the control unit 170 may control overall operations of the display device 100.

Additionally, the control unit 170 may control the display device 100 by a user command or internal program input through the user input interface unit 150 and may access the network to download an application or an application list desired by the user into the display device 100.

The control unit 170 may output channel information selected by the user through the display unit 180 or the audio output unit 185 together with the processed images or voice signals.

Additionally, the control unit 170 may output image signals or voice signals, which are input from the external device (e.g., a camera or a camcorder) through the external device interface unit 135, to the display unit 180 or the audio output unit 185 according to an external device image playback command received through the user input interface unit 150.

On the other hand, the control unit 170 may control the display unit 180 to display images. For example, the control unit 170 may control the display unit 180 to display broadcast images input through the tuner 131, external input images input through the external device interface unit 135, images input through the network interface unit, or images stored in the storage unit 140. In this case, an image displayed on the display unit 180 may be a still image or video, and may be a 2D image or a 3D image.

Additionally, the control unit 170 may perform control to play content stored in the video display device 100, received broadcast content, or external input content input from the outside. The content may be in various formats, such as broadcast images, external input images, audio files, still images, accessed web screens, and document files.

The wireless communication unit 173 may perform a wired or wireless communication with an external electronic device. The wireless communication unit 173 may perform short-range communication with an external device. To this end, the wireless communication unit 173 can support short-range communication by using at least one of Bluetooth™, Radio Frequency Identification (RFID), Infrared Data Association (IrDA), Ultra Wideband (UWB), ZigBee, Near Field Communication (NFC), Wireless-Fidelity (Wi-Fi), Wi-Fi Direct, and Wireless Universal Serial Bus (USB) technologies. The wireless communication unit 173 may support wireless communication between the display device 100 and a wireless communication system, between the display device 100 and another display device 100, or between networks including the display device 100 and another display device 100 (or an external server) through wireless area networks. The wireless area networks may be wireless personal area networks.

Herein, the other display device 100 may be a mobile terminal such as a wearable device (for example, a smart watch, a smart glass, and a head mounted display (HMD)) or a smartphone, which is capable of exchanging data (or interworking) with the display device 100. The wireless communication unit 173 can detect (or recognize) a communicable wearable device around the display device 100. Furthermore, if the detected wearable device is a device authenticated to communicate with the display device 100, the control unit 170 may transmit at least part of data processed in the display device 100 to the wearable device through the wireless communication unit 173. Accordingly, a user of the wearable device may use the data processed in the display device 100 through the wearable device.

The display unit 180 may convert image signals, data signals, or on-screen display (OSD) signals, which are processed in the control unit 170, or images signals or data signals, which are received in the external device interface unit 135, into R, G, and B signals to generate driving signals.

Furthermore, the display device 100 shown in FIG. 1 is just one embodiment of the present disclosure, and thus, some of the components shown in FIG. 1 may be integrated, added, or omitted according to the specification of the actually implemented display device 100.

That is, if necessary, two or more elements may be integrated into one element, or one element may be divided into two or more elements. Additionally, a function performed by each block is provided for describing the embodiments of the present disclosure, and a specific operation or device thereof does not limit the scope of the present disclosure.

According to another embodiment of the present disclosure, the display device 100 may not include the tuner 131 and the demodulation unit 132, unlike that illustrated in FIG. 1, and may receive images through the network interface unit 133 or the external device interface unit 135 and play the received images.

For example, the display device 100 may be divided into an image processing device such as a set-top box for receiving broadcast signals or content according to various network services, and a content playback device for playing content input from the image processing device.

In this case, an operating method of a display device according to an embodiment of the present disclosure, as described below, may be performed by one of the display device 100 described with reference to FIG. 1, an image processing device such as the separated set-top box, and a content playback device including the display unit 180 and the audio output unit 185.

Next, the remote control device according to an embodiment of the present disclosure will be described with reference to FIGS. 2 and 3.

Figure 2:
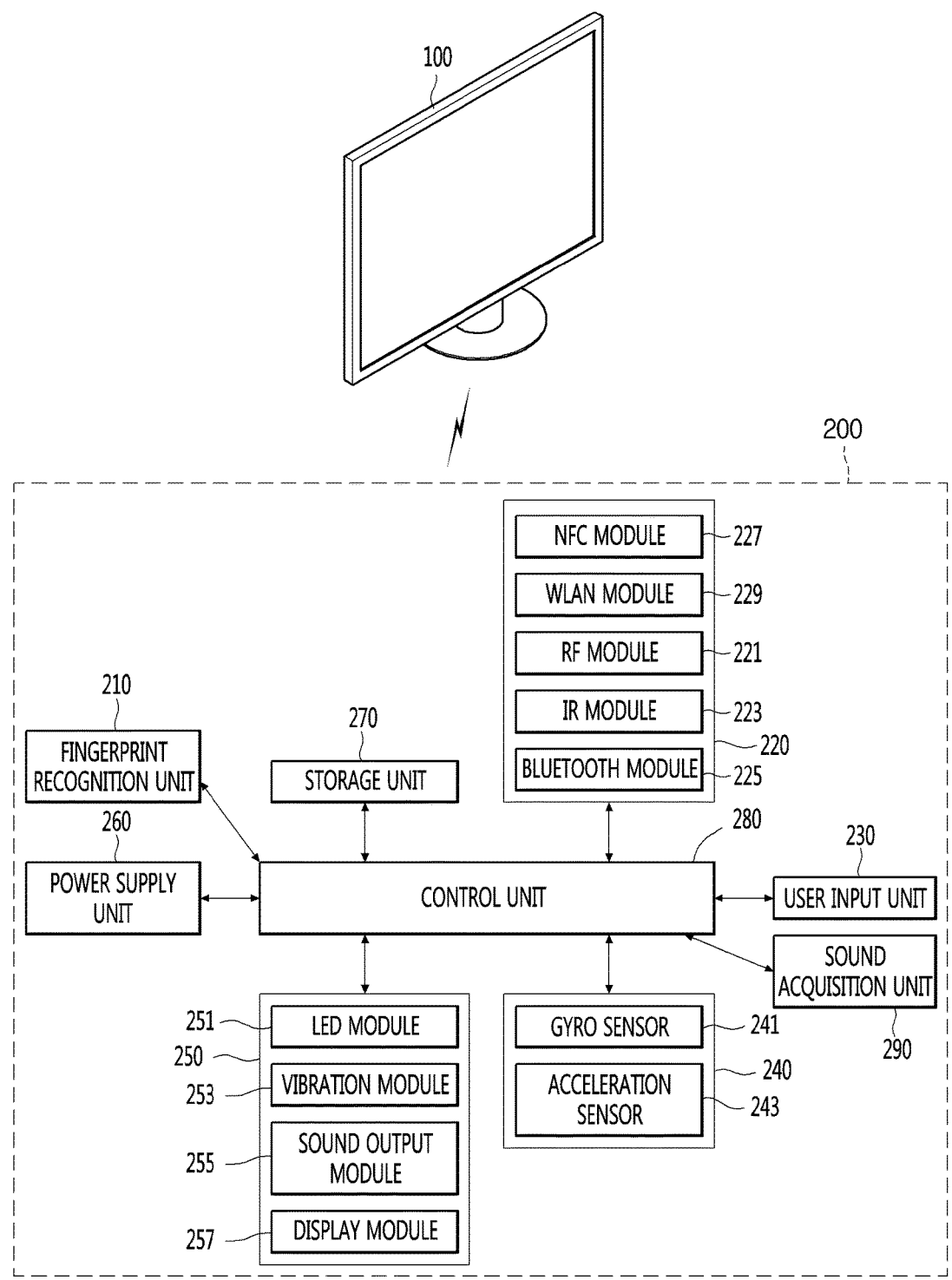
FIG. 2 is a block diagram of a remote control device according to an embodiment of the present disclosure.
Figure 3:
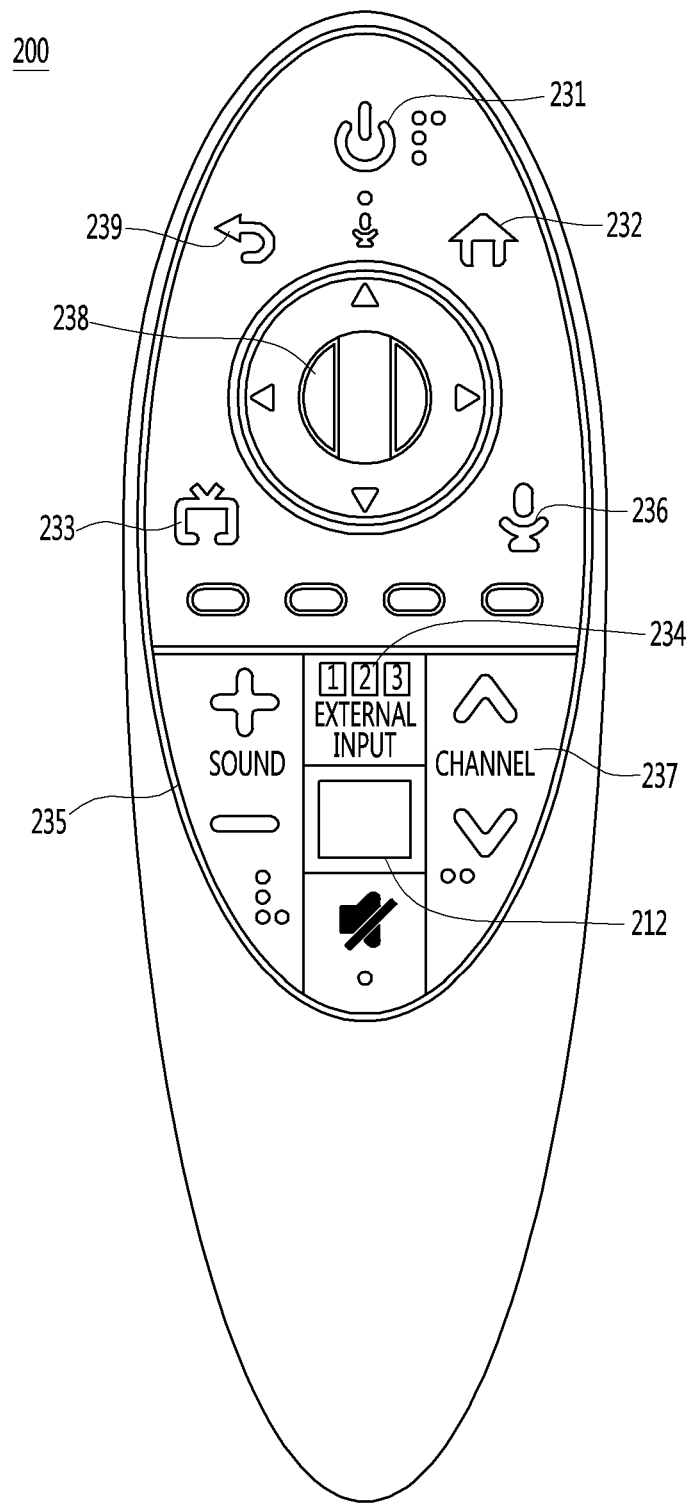
FIG. 3 illustrates an actual configuration example of the remote control device according to an embodiment of the present disclosure.

FIG. 2 is a block diagram of the remote control device according to an embodiment of the present disclosure, and FIG. 3 illustrates an actual configuration example of the remote control device according to an embodiment of the present disclosure.

First, referring to FIG. 2, the remote control device 200 may include a fingerprint recognition unit 210, a wireless communication unit 220, a user input unit 230, a sensor unit 240, an output unit 250, a power supply unit 260, a storage unit 270, a control unit 280, and a voice acquisition unit 290.

Referring to FIG. 2, the wireless communication unit 225 transmits/receives signals to/from any one of the display devices according to the above-mentioned embodiments of the present disclosure.

The remote control device 200 may include an RF module 221 for transmitting/receiving signals to/from the display device 100 according to an RF communication standard and an IR module 223 for transmitting/receiving signals to/from the display device 100 according to an IR communication standard. Additionally, the remote control device 200 may include a Bluetooth module 225 for transmitting/receiving signals to/from the display device 100 according to a Bluetooth communication standard. Additionally, the remote control device 200 may include a Near Field Communication (NFC) module 227 for transmitting/receiving signals to/from the display device 100 according to an NFC communication standard and a WLAN module 229 for transmitting/receiving signals to/from the display device 100 according to a Wireless LAN (WLAN) communication standard.

Additionally, the remote control device 200 may transmit signals containing information on a movement of the remote control device 200 to the display device 100 through the wireless communication unit 220.

On the other hand, the remote control device 200 may receive signals transmitted from the display device 100 through the RF module 221 and, if necessary, may transmit a command on power on/off, channel change, and volume change to the display device 100 through the IR module 223.

The user input unit 230 may include a keypad, a button, a touch pad, or a touch screen. A user may manipulate the user input unit 230 to input a command related to the video display device 100 to the remote control device 200. If the user input unit 230 includes a hard key button, a user may push the hard key button to input a command related to the display device 100 to the remote control device 200. Details thereof will be described below with reference to FIG. 3.

Referring to FIG. 3, the remote control device 200 may include a plurality of buttons. The plurality of buttons may include a fingerprint recognition button 212, a power button 231, a home button 232, a live button 233, an external input button 234, a volume control button 235, a voice recognition button 236, a channel change button 237, a check button 238, and a back button 239.

The fingerprint recognition button 212 may be a button for recognizing a user's fingerprint. According to an embodiment, the fingerprint recognition button 212 may perform a push operation and receive a push operation and a fingerprint recognition operation. The power button 231 may be a button for turning on/off the power of the display device 100. The home button 232 may be a button for moving to the home screen of the display device 100. The live button 233 may be a button for displaying live broadcast programs. The external input button 234 may be a button for receiving an external input connected to the display device 100. The volume control button 235 may be a button for adjusting a volume output from the display device 100. The voice recognition button 236 may be a button for receiving a user's voice and recognizing the received voice. The channel change button 237 may be a button for receiving broadcast signals of a specific broadcast channel. The check button 238 may be a button for selecting a specific function and the back button 239 can be a button for returning to a previous screen.

Referring again to FIG. 2, if the user input unit 230 includes a touch screen, a user may touch a soft key of the touch screen to input a command related to the display device 100 to the remote control device 200. Additionally, the user input unit 230 may include various types of input means that can be manipulated by a user, for example, a scroll key and a jog key, and this embodiment does not limit the scope of the present disclosure.

The sensor unit 240 may include a gyro sensor 241 or an acceleration sensor 243, and the gyro sensor 241 may sense information on a movement of the remote control device 200.

For example, the gyro sensor 241 may sense information on an operation of the remote control device 200 on the basis of x, y, and z axes, and the acceleration sensor 243 may sense information on a moving speed of the remote control device 200. Moreover, the remote control device 200 may further include a distance measurement sensor and sense a distance to the display unit 180 of the display device 100.

The output unit 250 may output image or voice signals in response to manipulation of the user input unit 230 or image or voice signals corresponding to signals transmitted from the display device 100. A user can recognize whether the user input unit 230 is manipulated or the video display device 100 is controlled through the output unit 250.

For example, the output unit 250 may include an LED module 251 for flashing, a vibration module 253 for generating vibration, a sound output module 255 for outputting sound, or a display module 257 for outputting an image, if the user input unit 230 is manipulated or signals are transmitted/received to/from the display device 100 through the wireless communication unit 220.

Additionally, the power supply unit 260 supplies power to the remote control device 200 and, if the remote control device 200 does not move for a predetermined time, stops supplying power, so that power waste can be reduced. The power supply unit 260 may resume the power supply if a predetermined key provided at the remote control device 200 is manipulated.

The storage unit 270 may store various types of programs and application data necessary for control or operation of the remote control device 200. If the remote control device 200 transmits/receives signals wirelessly through the display device 100 and the RF module 221, the remote control device 200 and the display device 100 transmit/receive signals through a predetermined frequency band.

The control unit 280 of the remote control device 200 may store, in the storage unit 270, information on a frequency band for transmitting/receiving signals wirelessly to/from the video display device 100 paired with the remote control device 200 and refer to the information.

The control unit 280 controls general matters related to control of the remote control device 200. The control unit 280 may transmit a signal corresponding to a predetermined key manipulation of the user input unit 230 or a signal corresponding to a movement of the remote control device 200 sensed by the sensor unit 240 to the display device 100 through the wireless communication unit 220.

Additionally, the voice acquisition unit 290 of the remote control device 200 may obtain voice.

The voice acquisition unit 290 may include at least one microphone 291 and acquire voice through the microphone 291.

Figure 4:
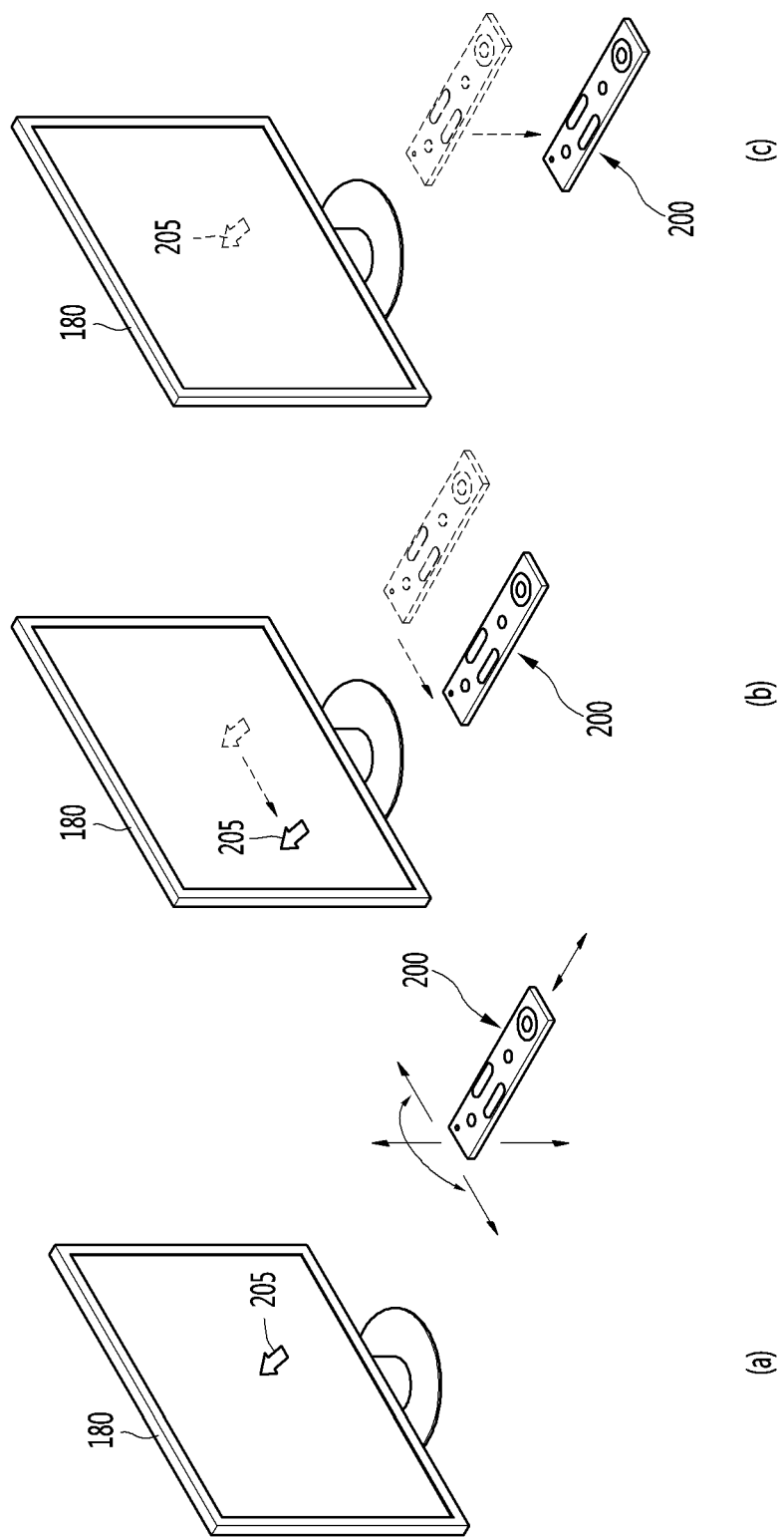
FIG. 4 illustrates an example of utilizing the remote control device according to an embodiment of the present disclosure.

Next, FIG. 4 is described.

FIG. 4 illustrates an example of utilizing the remote control device according to an embodiment of the present disclosure.

FIG. 4A illustrates an example in which a pointer 205 corresponding to the remote control device 200 is displayed on the display unit 180.

A user can move or rotate the remote control device 200 vertically or horizontally. The pointer 205 displayed on the display unit 180 of the display device 100 corresponds to a movement of the remote control device 200. Since the corresponding pointer 205 is moved and displayed according to a movement on a 3D space as show in the drawing, the remote control device 200 may also be referred to as a spatial remote control device.

FIG. 4B illustrates an example in which if a user moves the remote control device 200 to the left, the pointer 205 displayed on the display unit 180 of the display device 100 is also moved to the left according to the movement of the remote control device 200.

Information on the movement of the remote control device 200 detected through a sensor of the remote control device 200 is transmitted to the display device 100. The display device 100 may calculate the coordinates of the pointer 205 from the information on the movement of the remote control device 200. The display device 100 may display the pointer 205 to match the calculated coordinates.

FIG. 4C illustrates an example in which while a specific button in the remote control device 200 is pressed, a user moves the remote control device 200 away from the display unit 180. Due to this, a selection area in the display unit 180 corresponding to the pointer 205 may be zoomed in and displayed in an enlarged size.

On the contrary, if a user moves the remote control device 200 closer to the display unit 180, a selection area in the display unit 180 corresponding to the pointer 205 may be zoomed out and displayed in a reduced size.

On the other hand, if the remote control device 200 is moved away from the display unit 180, a selection area may be zoomed out and if the remote control device 200 is moved closer to the display unit 180, a selection area may be zoomed in.

Additionally, if a specific button in the remote control device 200 is pressed, recognition of a vertical or horizontal movement may be excluded. That is, if the remote control device 200 is moved away from or closer to the display unit 180, the up, down, left, or right movement may not be recognized and only the back and forth movement may be recognized. While a specific button in the remote control device 200 is not pressed, only the pointer 205 is moved according to the up, down, left or right movement of the remote control device 200.

Moreover, the moving speed or moving direction of the pointer 205 may correspond to the moving speed or moving direction of the remote control device 200.

On the other hand, the pointer in this specification means an object displayed on the display unit 180 in response to the operation of the remote control device 200. Accordingly, besides an arrow form displayed as the pointer 205 in the drawing, various forms of objects are possible. For example, the above concept includes a point, a cursor, a prompt, and a thick outline. The pointer 205 may be displayed in correspondence to one point of a horizontal axis and a vertical axis on the display unit 180 and also can be displayed in correspondence to a plurality of points such as a line and a surface.

Next, the configuration of the display system according to an embodiment of the present disclosure will be described with reference to FIG. 5.

Figure 5:
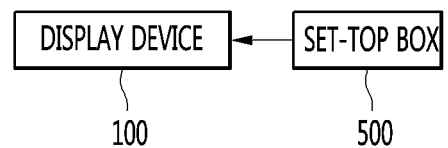
FIG. 5 is a block diagram illustrating a configuration of a display system according to an embodiment of the present disclosure.

FIG. 5 is a block diagram illustrating the configuration of the display system according to an embodiment of the present disclosure.

Referring to FIG. 5, the display system according to an embodiment of the present disclosure includes a display device 100 and a set-top box 500.

The display device 100 and the set-top box 500 may be wirelessly or wiredly connected to each other.

The set-top box 500 may be connected to the display device 100 through the external device interface unit 135.

The set-top box 500 may transmit broadcasting information to the display device 100. The broadcasting information may include EPG information containing a broadcast channel and information of time-based broadcast programs provided by the corresponding broadcast channel.

The set-top box 500 may transmit one or more of image signals and voice signals to the external device interface unit 135 of the display device 100.

The display device 100 may display images based on image signals received from the set-top box 500 on the display unit 180, and may output voice based on the received voice signals through the audio output unit 185.

The images based on the received image signals may be broadcast images, but embodiments of the present disclosure are not limited thereto. The images based on the received image signals may be streaming images.

The broadcast images may be live broadcast images.

Next, an operating method of the display device 100, according to an embodiment of the present disclosure, will be described with reference to FIG. 6.

Figure 6:
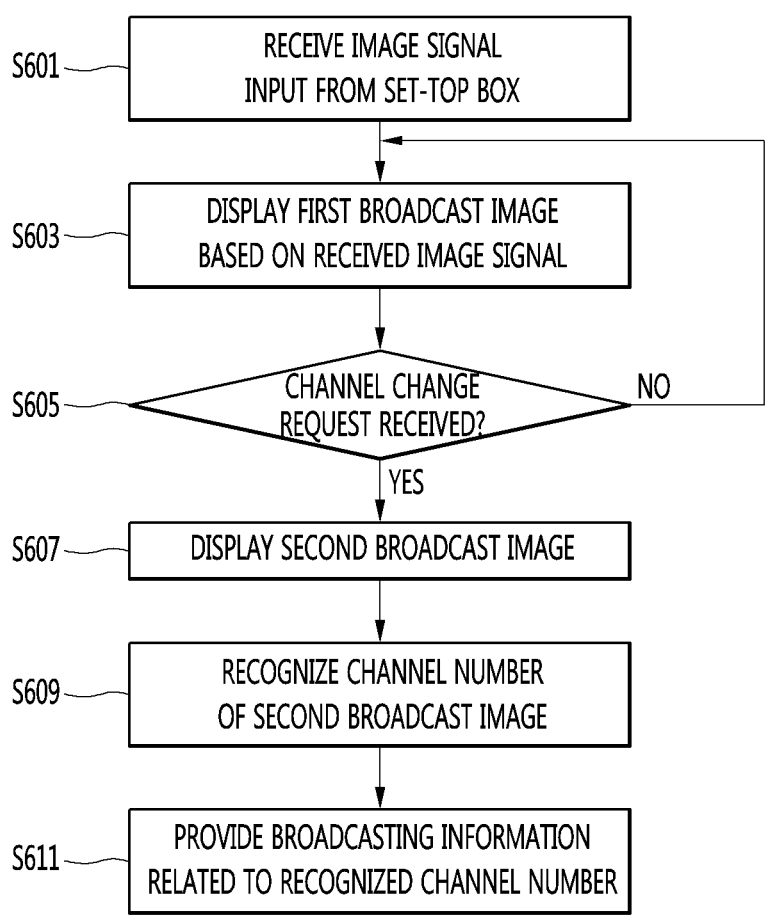
FIG. 6 is a flowchart of an operating method of a display device, according to an embodiment of the present disclosure.

FIG. 6 is a flowchart of the operating method of the display device, according to an embodiment of the present disclosure.

The external device interface unit 135 of the display device 100 receives an image signal input from the set-top box 500 connected to the display device 100 (S601).

In one embodiment, the external device interface unit 135 may include one or more HDMI terminals. The set-top box 500 may be connected to the display device 100 through the HDMI terminal.

In another embodiment, the external device interface unit 135 may be provided separately from the display device 100. In this case, the external device interface unit 135 may be wirelessly connected to the display device 100. The external device interface unit 135 may be connected to the set-top box 500 and may wirelessly transmit the image signal received from the set-top box 500 to the display device 100.

The image signal received from the set-top box 500 may be a broadcast signal or a content image signal provided by a content provider.

The broadcast image signal may be a live broadcast image.

Hereinafter, it is assumed that the image signal is the broadcast image signal.

The control unit 170 displays, on the display unit 180, a first broadcast image based on the received image signal (S603).

The first broadcast image displayed on the display device 180 may be an image of a first broadcast program corresponding to a first broadcast channel.

If a broadcast channel change request is received (S605), the control unit 170 displays a second broadcast image of the changed broadcast channel (S607).

In one embodiment, the control unit 170 may receive the broadcast channel change request from the remote control device 200.

The control unit 170 may change the first broadcast channel to a second broadcast channel in response to the broadcast channel change request.

The control unit 170 recognizes a channel number of the second broadcast image by using the second broadcast image of the changed broadcast channel (S609).

In one embodiment, if the broadcast channel is changed, the second broadcast image may include an image of the second broadcast program and a banner including information on the second broadcast program.

The banner may be displayed while overlapping the second broadcast image.

If the channel is not changed, the banner may be displayed for a predetermined time. The predetermined time may be 3 seconds, but this is merely an example.

The banner may include a channel number of a broadcast program, a title of the broadcast program, a name of a broadcasting company providing the broadcast program, and additional service information for providing additional services related to the broadcast program.

In one embodiment, the control unit 170 may acquire position information indicating a position where the channel number is displayed, and recognize the channel number based on the acquired position information.

The control unit 170 may store the position information in the storage unit 140. Even if the broadcast channel is changed again, the control unit 170 may quickly recognize the changed broadcast channel number by using the stored position information.

In one embodiment, the control unit 170 may capture the second broadcast image including the banner, divide the captured second broadcast image into a plurality of regions, and recognize the channel number within each divided region by using an optical character recognition (OCR) technique.

The control unit 170 provides broadcasting information related to the recognized channel number (S611).

In one embodiment, the broadcasting information related to the recognized channel number may be information of a broadcast program related to the recognized channel number. For example, the information of the broadcast program related to the channel number may include the corresponding channel number and information on a previous episode of the corresponding broadcast program, but these are merely an example.

That is, the broadcasting information related to the channel number may include channel recommendation information, a genre of the broadcast program, broadcast program recommendation information, and the like.

In one embodiment, the control unit 170 may provide broadcasting information related to the recognized channel number by using an EPG. The EPG may be information that the display device 100 can acquire after connecting to the set-top box 500.

The EPG may be a guide in which channel numbers and broadcast programs corresponding to the channel numbers are arranged in time order.

If the control unit 170 recognizes a channel number of a broadcast program that a user is currently watching, the control unit 170 may display information on the broadcast program corresponding to the recognized channel number by using the EPG.

In one embodiment, the control unit 170 may transmit the broadcasting information related to the recognized channel number to the mobile terminal of the user.

Next, operations S601 to S611 will be described briefly.

Figure 7:
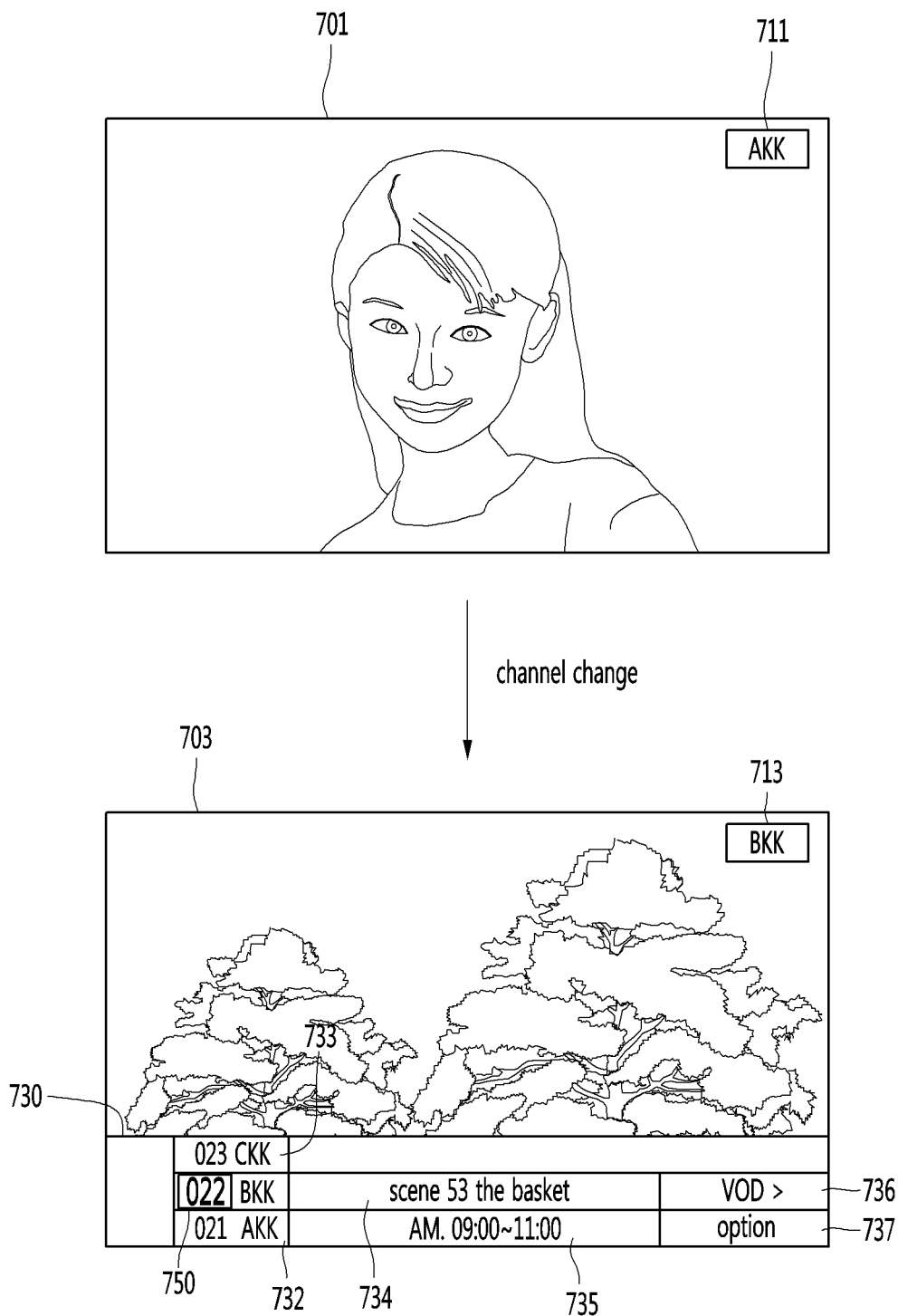
FIGS. 7 and 8 are views for describing an example of recognizing a channel number of a current on-air broadcast program and providing broadcasting information related to the recognized channel number, according to an embodiment of the present disclosure.
Figure 8:
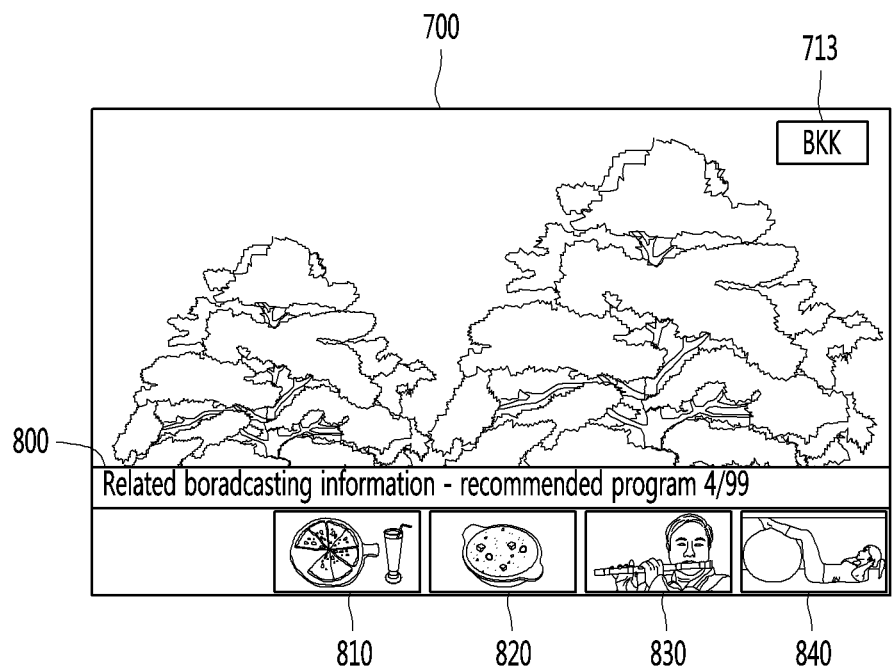

FIGS. 7 and 8 are views for describing an example of recognizing a channel number of a current on-air broadcast program and providing broadcasting information related to the recognized channel number, according to an embodiment of the present disclosure.

In FIGS. 7 and 8, it is assumed that the display device 100 displays a broadcast image input from the set-top box 500 on the display unit 180.

Referring to FIG. 7, the control unit 170 displays a first broadcast program image 701 corresponding to a first channel number. The first broadcast program image 701 may be displayed while overlapping a broadcasting company name 711 identifying a broadcasting company providing the first broadcast program image 701.

The first broadcast program image 701 may be an image that is displayed according to power on/off of the display device 100 and the set-top box 500.

The first broadcast program image 701 may be an image that a user currently watches after the power of the display device 100 and the set-top box 500 is turned on.

On the other hand, the control unit 170 may change the first broadcast channel to the second broadcast channel in response to the broadcast channel change request.

Accordingly, the control unit 170 may change the first broadcast program image 701 to a second broadcast program image 703 corresponding to the second broadcast channel.

While changing the broadcast channel, the control unit 170 may further display a banner 730 including information on the second broadcast program image 703.

The banner 730 may include the channel number of the second broadcast program image 703, the broadcasting company name 731, channel numbers 732 and 733 before and after the channel number of the broadcast program, which the user is currently watching, episode and title 734 of the broadcast program, which the user is currently watching, a broadcasting time 735 of the broadcast program, which the user is watching, a VOD service 736 that the content provider can provide, and an option 737 for providing other broadcast services.

The control unit 170 may recognize the channel number <022> of the second broadcast program image 703, which the user is currently watching, by using the second broadcast program image 703 and the banner 730. The control unit 170 may acquire a position of a region 750, in which the channel number <022> is displayed, by using the second broadcast program image 703 and the information displayed on the banner 730.

The control unit 170 may recognize the channel number <022> displayed within the region 750 through the acquired position of the region 750.

Even if the channel is changed later, the control unit 170 may quickly recognize the changed channel number because the acquired position of the region 750 is stored.

The process of recognizing the channel number will be described later in detail.

The control unit 170 may provide broadcasting information related to the recognized channel number <022>.

For example, as shown in FIG. 8, the control unit 170 may provide related broadcasting information 800 based on the recognized channel number <022> and the EPG received from the set-top box 500.

Specifically, the control unit 170 may display the related broadcasting information 800 including a plurality of thumbnail images 810 to 840 corresponding to previous episodes of the second broadcast program corresponding to the channel number <022>.

The control unit 170 may extract the broadcast program information by comparing the recognized channel number <022> and the EPG, and may recommend the related broadcasting information 800 capable of watching the previous episode of the corresponding broadcast program by using the extracted broadcast program information.

If one of the plurality of thumbnail images 810 to 840 is selected, the control unit 170 may play a broadcast program of a previous episode corresponding to the selected thumbnail image.

As described above, the user can receive the information on the broadcast channel and the broadcast program, which the user is watching, from the TV itself through the set-top box 500, thereby efficiently using the original function of the TV.

Hereinafter, the process of recognizing the channel number will be described in detail.

FIGS. 9 to 15 are views for describing the process of recognizing a channel number of a broadcast program that a user is currently watching, according to an embodiment of the present disclosure.

Figure 9:
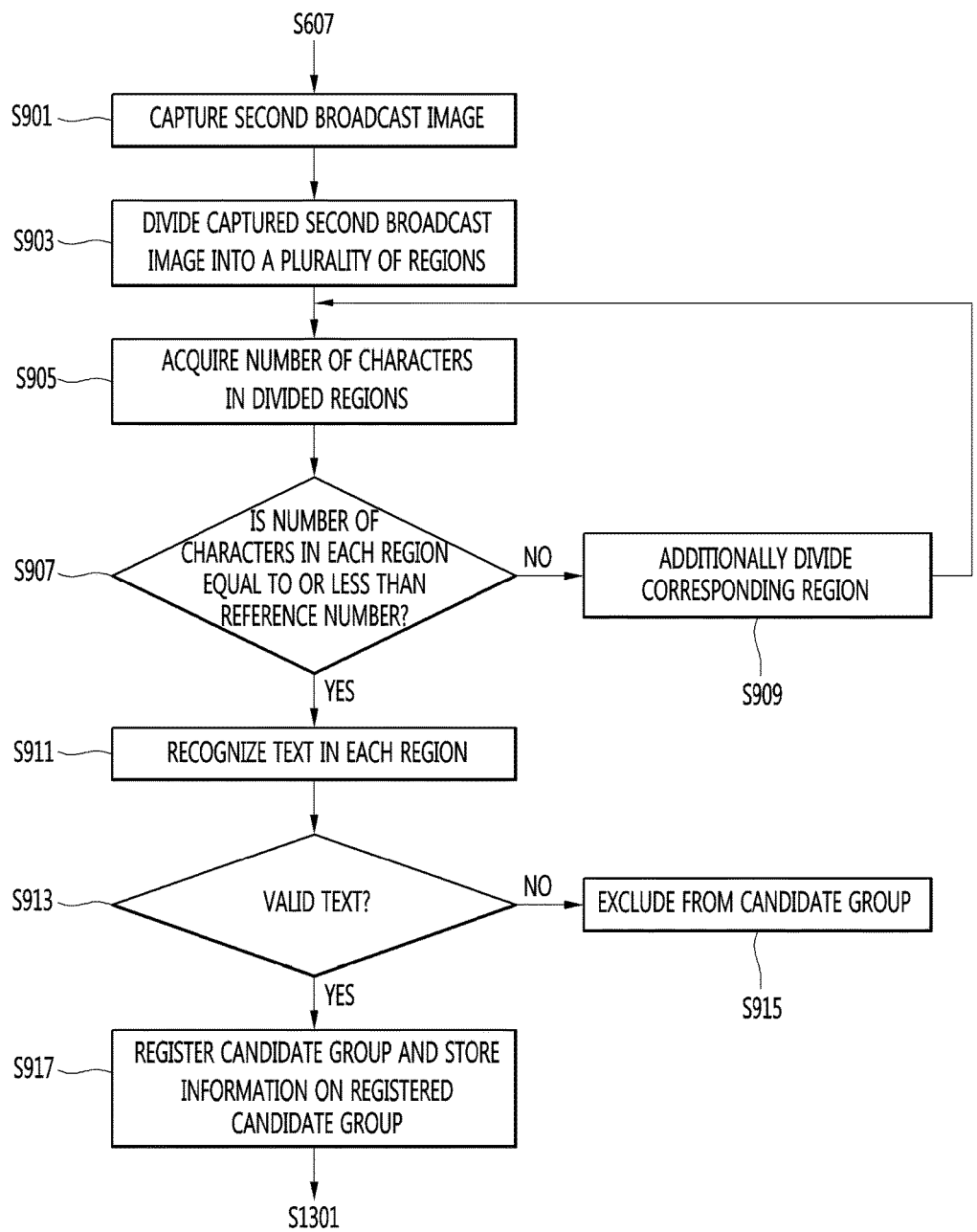
FIGS. 9 to 15 are views for describing a process of recognizing a channel number of a broadcast program that a user is currently watching, according to an embodiment of the present disclosure.

FIG. 9 is a detailed flowchart of operation S609 of FIG. 6.

The control unit 170 captures the second broadcast image (S901).

In one embodiment, the control unit 170 may recognize an output time point of the banner upon channel change, and capture the second broadcast image including the banner if the banner is output. To this end, the control unit 170 may store the output time point of the banner in the storage unit 140.

The output time point of the banner may be 0.3 seconds after the channel change, but this is merely an example.

The control unit 170 divides the captured second broadcast image into a plurality of regions (S903).

Sizes of the divided regions may be equal to or different from each other.

One divided region may partially overlap another region adjacent thereto.

The control unit 170 acquires the number of characters in each of the plurality of divided regions (S905).

The character may be a number or a letter. The letter may be alphabet or Korean, but this is merely an example.

The control unit 170 may recognize the character or the number of characters in the corresponding region by using teeseract Application Programming Interface (API) that is an open source of OCR.

The control unit 170 checks whether the number of characters in each region is equal to or less than a reference number (S907).

The reference number may be three. This is because the channel number is generally composed of three or less characters.

If the number of characters in the divided region exceeds the reference number, the control unit 170 additionally divides the corresponding region (S909).

If the number of characters in the divided region exceeds the reference number, the control unit 170 may subdivide the divided region into smaller regions.

This is because the recognition rate may be deteriorated as the number of characters in the divided region increases.

If the number of characters in the divided region is equal to or less than the reference number, the control unit recognizes a text in the corresponding region (S911).

In one embodiment, if the number of characters in the divided region is three or less, the control unit may recognize a text in the corresponding region.

The control unit 170 may recognize the text in the corresponding region by using teeseract API that is an open source of OCR.

The control unit 170 checks whether the recognized text is a valid text (S913). If the recognized text is not a valid text, the control unit 170 excludes the corresponding region from a candidate group (S913).

In one embodiment, if the characters constituting the text are composed of a number or a letter, the control unit 170 may determine the corresponding text as a valid text, and if one of the characters constituting the text is not composed of a number or a letter, the control unit 170 may determine the corresponding text as an invalid text.

Since each of the plurality of regions may be partially overlapped, the number or the letter may be partially included in the region. This will be described later.

If the recognized text is determined as a valid text, the control unit 170 registers the corresponding region as a candidate group and stores candidate group information (S917).

If the text in the divided region is determined as a valid text, the control unit 170 may register the corresponding region as a candidate group region for channel number recognition. Simultaneously, the control unit 170 may store candidate group information corresponding to the candidate group region in the storage unit 140.

The candidate group information may include at least one of coordinates of the corresponding region, character recognized in the corresponding region, a size of the recognized character, a length of the recognized character, and a recognition rate indicating accuracy of character recognition.

Hereinafter, the process of dividing the captured broadcast image and registering the divided region as the candidate group will be described.

Figure 10:
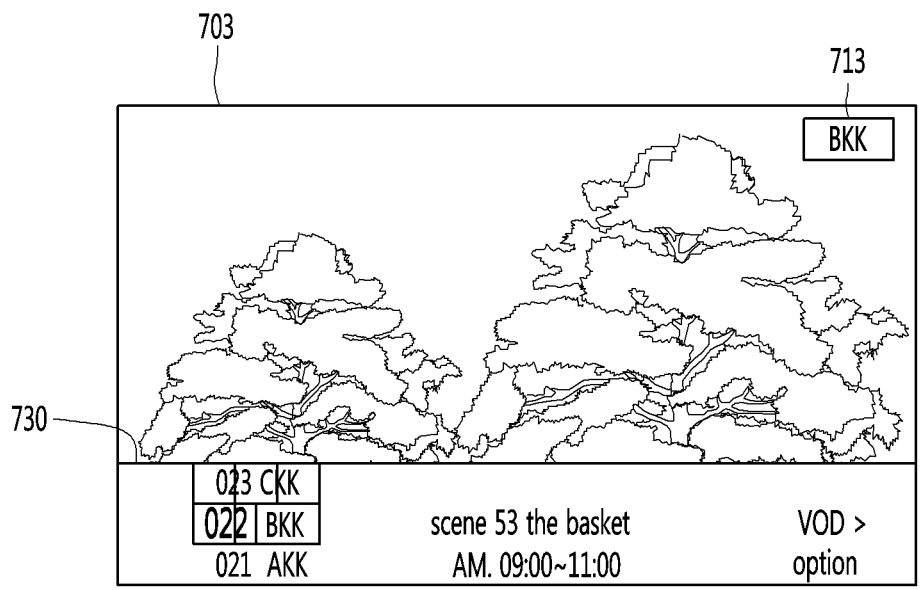
Figure 11:
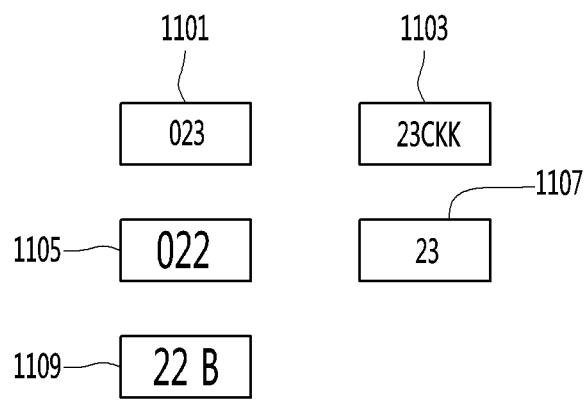
Figure 12:
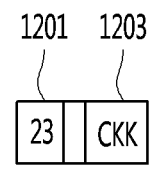

FIGS. 10 to 12 are views for describing the process of dividing the captured broadcast image and registering the divided region as the candidate group, according to an embodiment of the present disclosure.

In FIGS. 10 to 12, the description will be provided with reference to the embodiment of FIG. 7.

Referring to FIG. 10, the display device 100 displays the second broadcast program image 703 and the banner 730 according to the change of the broadcast channel.

The control unit 170 may capture the second broadcast program image 703 at a time point if the banner 703 is output.

Then, the control unit 170 may divide the second broadcast program image 703 including the banner 730 into a plurality of regions.

For convenience of description, only a part of the banner 730 is divided in FIG. 10, but the entire banner 730 or the second broadcast program image 703 may be divided.

The control unit 170 may check the number of characters in each divided region.

FIG. 11 illustrates the recognized regions 1101 to 1109.

The control unit 170 may check whether the number of characters in each of the recognized regions 1101 to 1109 is three or less. For example, it may be checked that the number of characters in the first region 1101, the third region 1105, and the fifth region 1109 is three. Also, it may be checked that the number of characters in the second region 1103 is five, and the number of characters in the fourth region 1107 is two.

Since the number of characters in the second region 1103 exceeds the reference number, the control unit 170 may divide the second region 1103 into a first sub-region 1201 and a second sub-region 1203 as shown in FIG. 12.

Since the number of characters in the first sub-region 1201 is two and the number of characters in the second sub-region 1205 is three, this satisfies the condition that the number of characters is equal to or less than the reference number.

Then, the control unit 170 may register the corresponding region as the candidate group or exclude the corresponding region from the candidate group according to whether the text in the plurality of regions shown in FIGS. 11 and 12 is a valid text.

For example, since a number "3" of a text <23> within the fourth region 1107 is cut away, the control unit 170 may exclude the fourth region 1107 from the candidate group.

Since the number or the character in the other regions 1101, 1105, 1109, 1201, and 1203 is not cut away, the control unit 170 may determine each region as a valid text and register each region as the candidate group.

Additionally, the control unit 170 may store information on the registered candidate group. The information on the registered candidate group may include at least one of coordinates of the corresponding region, character recognized in the corresponding region, a size of the recognized character, a length of the recognized character, a length of the text that is a set of recognized characters, and accuracy of character recognition.

Next, an example of filtering the candidate group and selecting a final candidate group for channel number recognition, based on the information on registered candidate group will be described.

Figure 13:
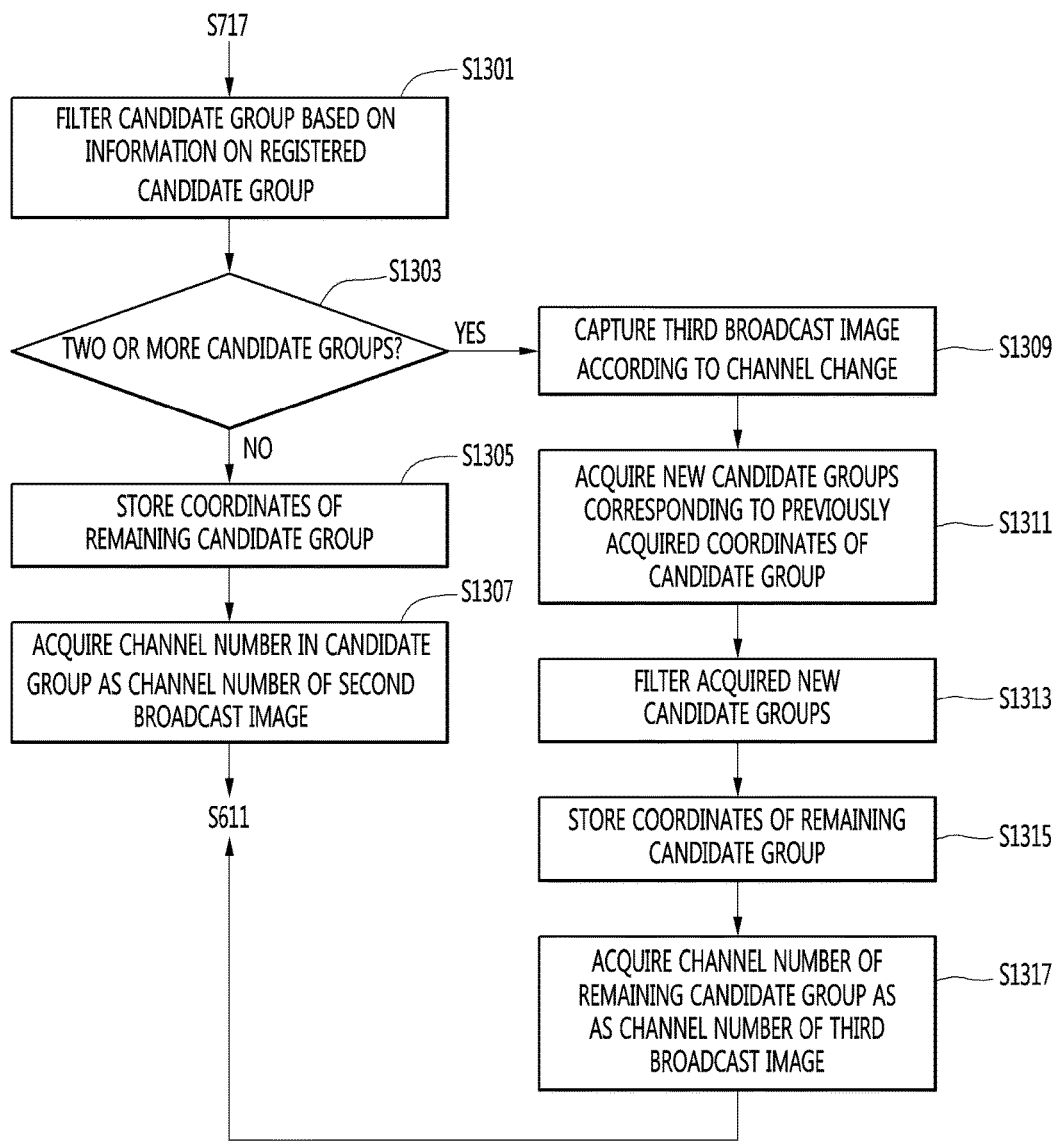

FIG. 13 is a flowchart for describing an example of filtering the candidate group and selecting the final candidate group for channel number recognition, based on the information on registered candidate group, according to an embodiment of the present disclosure.

FIG. 13 is a process that is performed after the flowchart of FIG. 9.

Referring to FIG. 13, the control unit 170 may filter the candidate group, based on the information on the registered candidate group (S1301).

In one embodiment, the control unit 170 may exclude the candidate group including a letter (not a number) among the characters within the candidate group. This is because the channel number is generally composed of the number.

Referring to FIG. 11, the control unit 170 may filter the candidate groups 1109 and 1203, in which the character is mixed, among the registered candidate groups 1101, 1105, 1109, 1201, and 1203.

Additionally, the control unit 170 may leave only the candidate group 1105 having the largest text size and delete the other candidate groups 1101 and 1201 among the candidate groups 1101, 1105, and 1201 remaining after the filtering. This is because the channel number of the channel being currently broadcast is displayed by a larger size than that of the adjacent channel number.

Additionally, if the coordinates of the candidate groups are similar but the lengths of the texts are different, the control unit 170 may exclude the candidate group having a small text size. For example, if the text length of the first candidate group is 5 and the text length of the second candidate group is 6, the control unit 170 may filter the first candidate group. This is because a part of the text may be cut away during the division and recognition process.

If the recognized texts of the candidate groups are equal to each other, the control unit 170 may leave one candidate group and delete the other candidate groups.

Here, it is assumed that the text is composed of only numbers.

The control unit 170 may cumulatively count the number of times of extractions of the candidate groups having the same text composed of three or less numbers. The control unit 170 may align the candidate groups having the same text composed of three or less numbers according to the cumulative number of times of extractions.

The control unit 170 checks whether the number of filtered candidate groups is two or more (S1303).

If the number of filtered candidate groups is less than two (if only one candidate group remains), the control unit 170 stores the coordinates of the candidate group (S1305).

If only one filtered candidate group remains, the control unit 170 may select the candidate group as a final candidate group and store coordinates of the selected final candidate group.

The selected final candidate group may be a region where the channel number of the broadcast image that a user is currently watching is displayed.

Figures 14, 15:
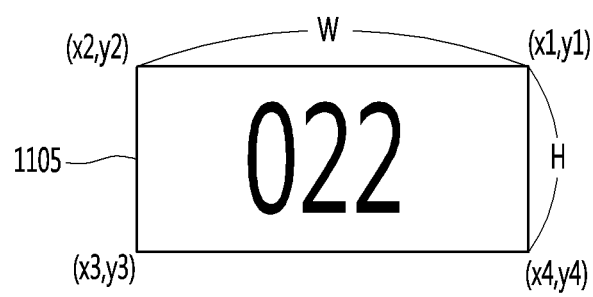

Referring to FIG. 14, the selected final candidate group 1105 among the registered candidate groups 1101 to 1109 is shown. The final candidate group may have a rectangular shape, but this is merely an example.

The control unit 170 may store (x1, y1), (x2, y2), (x3, y3), and (x4, y4) that are vertex coordinates of the final candidate group. Additionally, the control unit 170 may store a width length (W) and a height length (H) of the final candidate group.

Additionally, as shown in FIG. 15, the control unit 170 may store information of the set-top box 500, channel change time, and banner output time point, as well as the information on the coordinates of the final candidate group.

The information of the set-top box 500 may include information capable of identifying the set-top box 500, such as a model name of the set-top box 500 or a version of the set-top box 500.

The channel change time may be the time necessary for changing the channel in response to the broadcast channel change request.

The banner output time point may include one or more of a time point if the banner is output and a time point if the display of the banner is maintained, after the change of the broadcast channel.

The control unit 170 acquires the channel number within the candidate group as the channel number of the second broadcast image, based on the coordinates of the candidate group (S1307).

If the broadcast channel is changed later, the control unit 170 may recognize the channel number of the corresponding region based on the coordinates of the final candidate group.

If the coordinates of the final candidate group are acquired, the display device 100 may quickly recognize the changed channel number by using a position corresponding to the coordinates of the final candidate group acquired within the broadcast image of the changed channel.

Then, the control unit 170 provides broadcasting information related to the acquired channel number (S611).

That is, even if the channel is changed, the display device 100 may recognize the changed broadcast channel number through one channel number recognition process without complicated processes.

Accordingly, the display device 100 may actively provide a user with broadcasting information related to the channel number by using an EPG.

If the display device 100 is rebooted, the control unit 170 may recognize a channel number of an image being currently broadcasted by using the stored position information of the channel number. That is, since the acquired position information of the channel number is stored, an algorithm for finding a channel number need not be used again.

On the other hand, if the number of filtered candidate groups is two, the control unit 170 captures a third broadcast image according to a channel change (S1309).

If the number of filtered candidate groups is two or more, the control unit 170 may display information indicating that it is impossible to recognize the channel number for selecting the final candidate group.

Additionally, if the number of filtered candidate groups is two or more, the control unit 170 may display information requesting the change of the broadcast channel for selecting the final candidate group.

The control unit 170 may change the second broadcast channel to a third broadcast channel in response to the channel change request and may display a third broadcast image corresponding to the third broadcast channel. Additionally, the control unit 170 may capture the third broadcast image.

The control unit 170 acquires new candidate groups corresponding to the acquired coordinates of the two or more candidate groups (S1309).

The control unit 170 may acquire two or more new candidate groups within the corresponding captured third broadcast image by using the acquired coordinates of the two or more candidate groups. Each of the two or more new candidate groups may be the same as the coordinates of each of the previously acquired two or more candidate groups.

Simultaneously, the control unit 170 may acquire information on each of the two or more new candidate groups.

The control unit 170 filters the acquired new candidate groups (S1311) and stores the coordinates of the remaining candidate groups (S1313).

The control unit 170 may leave only one candidate group based on the information on each of the new candidate groups. For example, if the text (horizontal) lengths of the new candidate groups are equal to each other, the control unit 170 may select the candidate group having the largest vertical text length as the final candidate group.

The control unit 170 acquires the channel number within the remaining candidate group as the channel number of the third broadcast image (S1315) and provides broadcasting information related to the acquired channel number (S611).

Through the above processes, the control unit 170 may select the final candidate group and store the coordinates of the selected final candidate group. This will be described below with reference to FIG. 14.

Additionally, even in this case, information other than the information on the coordinates of the final candidate group may be stored together as shown in FIG. 15.

Figure 16:
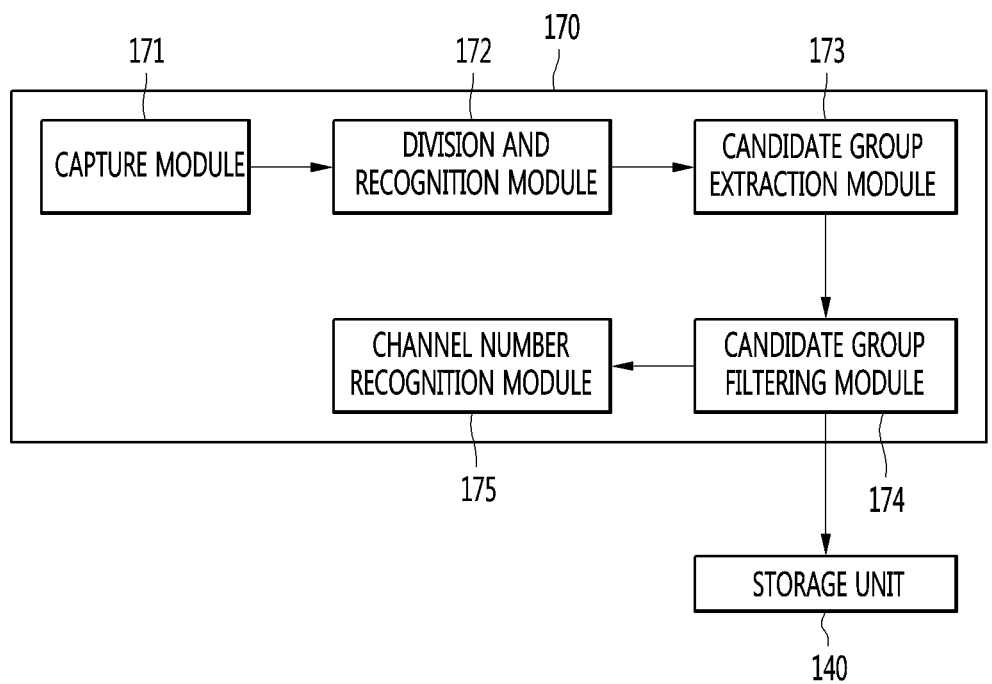
FIG. 16 is a block diagram illustrating a detailed configuration of a control unit that recognizes a broadcast channel number, according to an embodiment of the present disclosure.

FIG. 16 is a block diagram illustrating a detailed configuration of the control unit that recognizes the broadcast channel number, according to an embodiment of the present disclosure.

The control unit 170 according to an embodiment of the present disclosure may include a capture module 171, a division and recognition module 172, a candidate group extraction module 173, a candidate group filtering module 174, and a channel number recognition module 175.

The capture module 171 may capture the broadcast image that is being displayed. In particular, if the channel is changed, the capture module 171 may capture the broadcast image of the changed broadcast channel.

The division and recognition module 172 may divide the captured broadcast image into a plurality of regions. The division and recognition module 172 may recognize the characters within the plurality of divided regions.

The division and recognition module 172 may check the number of characters included in each of the plurality of regions and additionally divide the corresponding region if the number of characters exceeds the reference number.

If the number of characters in each of the plurality of regions is equal to or less than the reference number, the division and recognition module 172 may recognize the text in the corresponding region.

The candidate group extraction module 173 may check whether the recognized text is a valid text. If the recognized text is not a valid text, the candidate group extraction module 173 may exclude the corresponding region from the candidate group.

If the recognized text is a valid text, the candidate group extraction module 173 may register the corresponding region as the candidate group.

The candidate group extraction module 173 may store information on the registered candidate group in the storage unit 140.

The candidate group filtering module 174 may filter the candidate groups based on the information on each of the plurality of registered candidate groups.

After the filtering, the candidate group filtering module 174 may store information on coordinates of the final candidate group in the storage unit 140.

The channel number recognition module 175 may recognize the channel number by using the stored information on the coordinates of the final candidate group.

The channel number recognition module 175 may provide broadcasting information related to the recognized channel number by using the recognized channel number and the EPG.

Next, a process of recognizing a channel number by using a banner, according to another embodiment of the present disclosure, will be described below.

Figure 17:
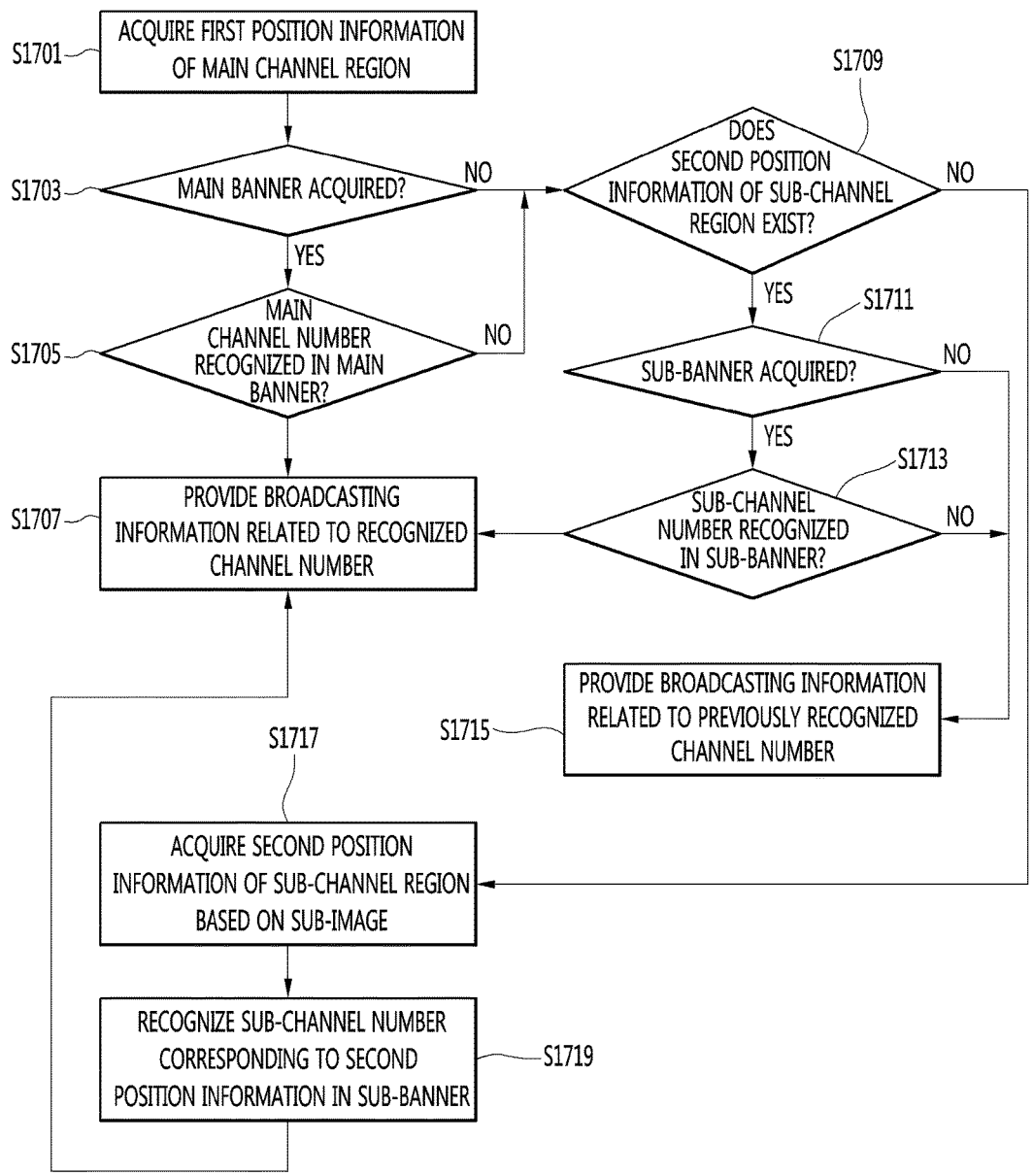
FIG. 17 is a flowchart of a process of recognizing a channel number by using a banner, according to another embodiment of the present disclosure.

FIG. 17 is a flowchart of a process of recognizing a channel number by using a banner, according to another embodiment of the present disclosure.

Hereinafter, it is assumed that the channel numbers are displayed at two positions. This is because a position of the displayed banner may be changed according to the channel.

For example, the channel numbers of the broadcast channels included in the first broadcast channel group may be displayed in a main banner of a first position, and the channel numbers of the broadcast channels included in the second broadcast channel group may be displayed in a sub-banner of a second position.

A region where the channel numbers of the broadcast channels included in the first broadcast channel group is referred to as a main channel region, and a region where the channel numbers of the broadcast channels included in the second broadcast channel group is referred to as a sub-channel region.

The control unit 170 acquires first position information of the main channel region (S1701).

In one embodiment, the control unit 170 may acquire the first position information of the main channel region based on the embodiment of FIGS. 9 to 13. The first position information may include coordinates of the position where the main channel region is displayed.

The control unit 170 checks whether a main banner is acquired (S1703). If the main banner is acquired, the control unit 170 checks whether the main channel region is recognized within the main banner (S1705).

In one embodiment, if the channel is changed, the control unit 170 may acquire the main banner through comparison between broadcast images. Specifically, if the position of the banner where the first broadcast image is displayed is the same as the position of the main banner where the second broadcast image of the changed channel is displayed, the control unit 170 may acquire the main banner based on the degree of image change. If the degree of the image change is less than a preset variation, the control unit 170 may acquire the corresponding region as the main banner.

The control unit 170 may recognize the main channel region based on the first position information within the acquired main banner.

If the main channel region is recognized, the control unit 170 provides broadcasting information related to the recognized channel region (S1707).

On the other hand, if the main banner is not acquired, the control unit 170 checks whether second position information corresponding to the sub-channel region exists (S1709).

That is, this is because the display position of the sub-banner corresponding to the second broadcast channel group may be different from the display position of the main banner, and thus, the channel number within the main channel region may not be recognized.

The control unit 170 may check whether the second position information corresponding to the sub-channel region is stored in the storage unit 140.

If the second position information exists, the control unit 170 checks whether the sub-banner has been acquired (S1711).

If the second position information of the sub-channel region is stored in the storage unit 140, the control unit 170 may check whether the sub-banner has been acquired, by using the process of acquiring the main banner.

If the sub-banner has been acquired, the control unit 170 checks whether the sub-channel region has been recognized within the sub-banner (S1713).

The control unit 170 may recognize the channel number within the sub-banner by using the second position information of the sub-channel region within the sub-banner.

If the sub-channel region has been recognized, the control unit 170 provides broadcasting information related to the recognized sub-channel region (S1707).

On the other hand, if the sub-channel region has not been recognized within the sub-banner, the control unit 170 provides broadcasting information related to the previously recognized channel number (S1715).

On the other hand, if the second position information of the sub-channel region does not exist, the control unit 170 acquires second position information of the sub-channel region based on a sub-image (S1717).

In one embodiment, the sub-image may be images obtained by capturing images of the broadcast channels included in the second broadcast channel group.

The sub-image may include a sub-banner. The control unit 170 may acquire the second position information of the sub-channel region by using the sub-banner corresponding to the sub-image. In this process, the embodiment of the channel number recognition of FIGS. 9 to 13 may be used.

The control unit 170 recognizes the sub-channel region corresponding to the second position information within the sub-banner (S1719) and provides broadcasting information related to the recognized sub-channel region (S1707).

According to the embodiment of the present disclosure, even if the display position of the banner changes according to the broadcast channel, it is possible to quickly recognize the channel number through a channel number display region corresponding to each banner.

On the other hand, according to embodiments of the present disclosure, the channel number may not be recognized even in the embodiment of FIG. 17. This is because the user interface provided by the set-top box 500 is updated and thus the positions of main banner and the sub-banner may change.

Figure 18:
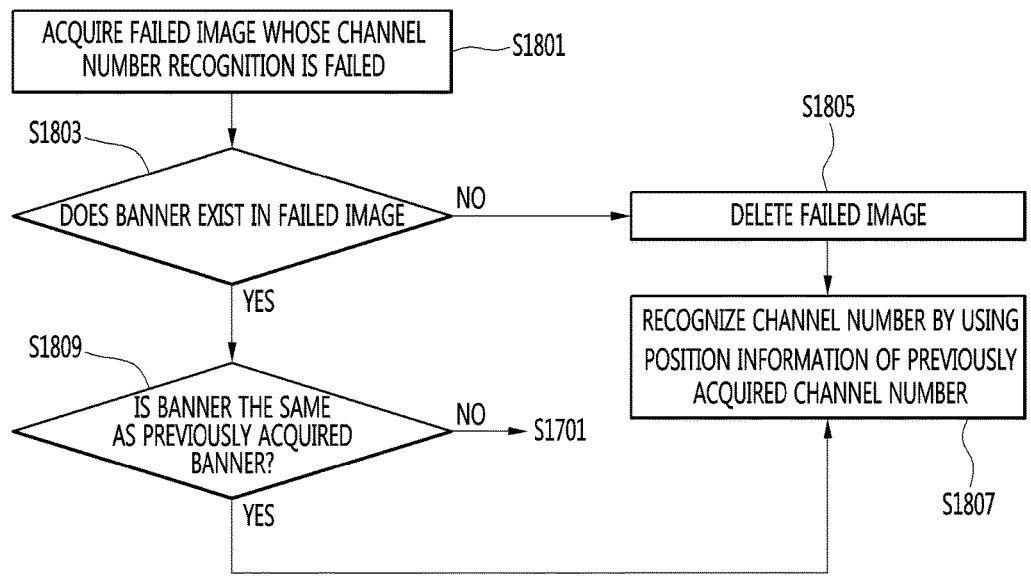
FIG. 18 is a flowchart of a process if a channel number is not recognized even through a main banner and a sub-banner, according to an embodiment of the present disclosure.

FIG. 18 is a flowchart of a process if a channel number is not recognized even through a main banner and a sub-banner, according to an embodiment of the present disclosure.

Referring to FIG. 18, the control unit 170 acquires a failed image whose channel number recognition is failed (S1801).

The control unit 170 may capture the image of the broadcast channel whose channel number recognition is failed. If the channel number is not recognized a preset number of times or more through the channel number recognition process, the control unit 170 may capture the corresponding image.

The control unit 170 checks whether a banner exists in the failed image (S1803).

If the banner does not exist in the failed image, the control unit 170 deletes the failed image (S1805) and recognizes the channel number by using the position information of the previously acquired channel number (S1807).

If the banner exists in the failed image, the control unit 170 checks whether the corresponding banner is the same as the previously acquired banner (S1809).

The control unit 170 may compare the previously acquired main banner and sub-banner with the banner within the failed image.

The control unit 170 may perform the comparison between the banners by using banner colors. Generally, the banner may be displayed by using a semi-transparent color.

If the banner within the failed image is the same as the previously acquired banner, the control unit 170 recognizes the channel number by using the position information of the previously acquired channel number (S1807).

If the banner within the failed image is not the same as the previously acquired banner, the control unit 170 returns to operation S1701 to perform the channel number recognition process.

On the other hand, the display position of the channel number may change according to a type of the set-top box 500 an a version of the set-top box 500.

Figure 19A:
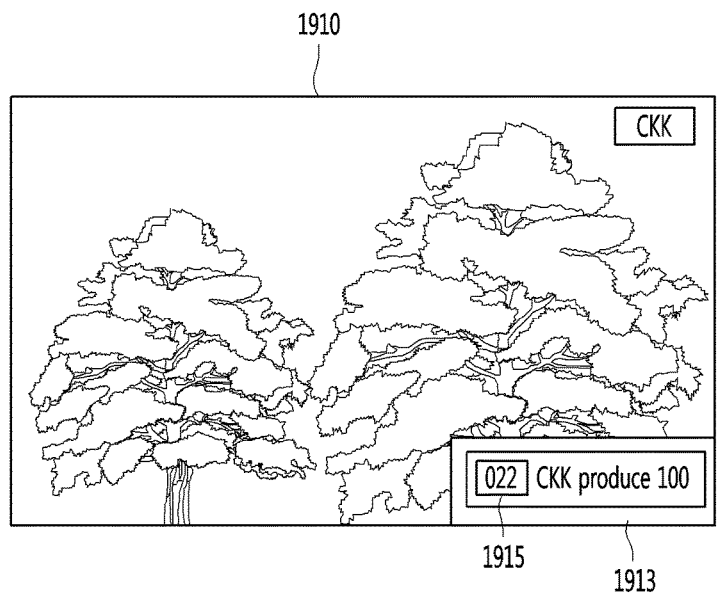
FIGS. 19A to 19C are views for describing different display positions of a channel number according to a type of a set-top box connected to the display device.
Figure 19B:
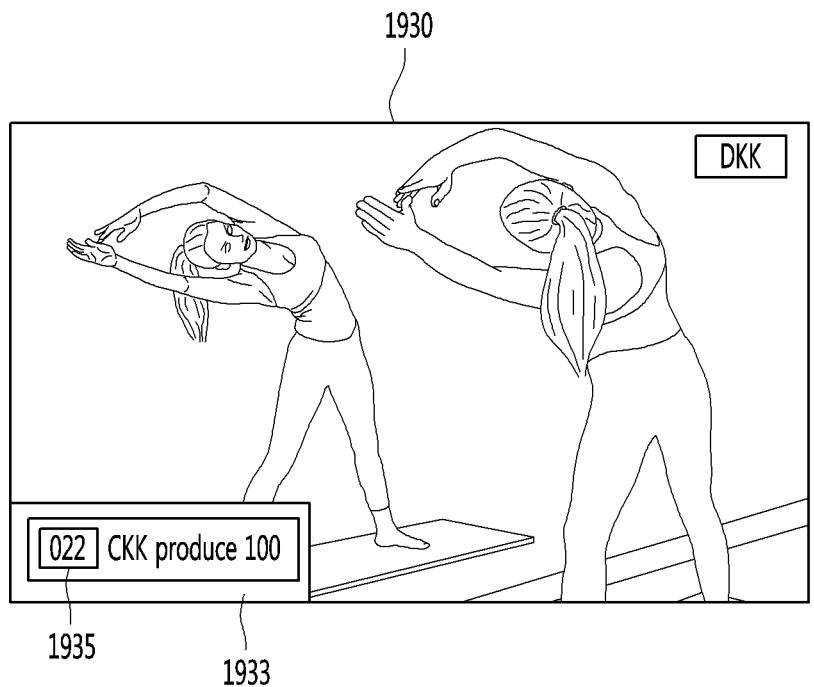
Figure 19C:
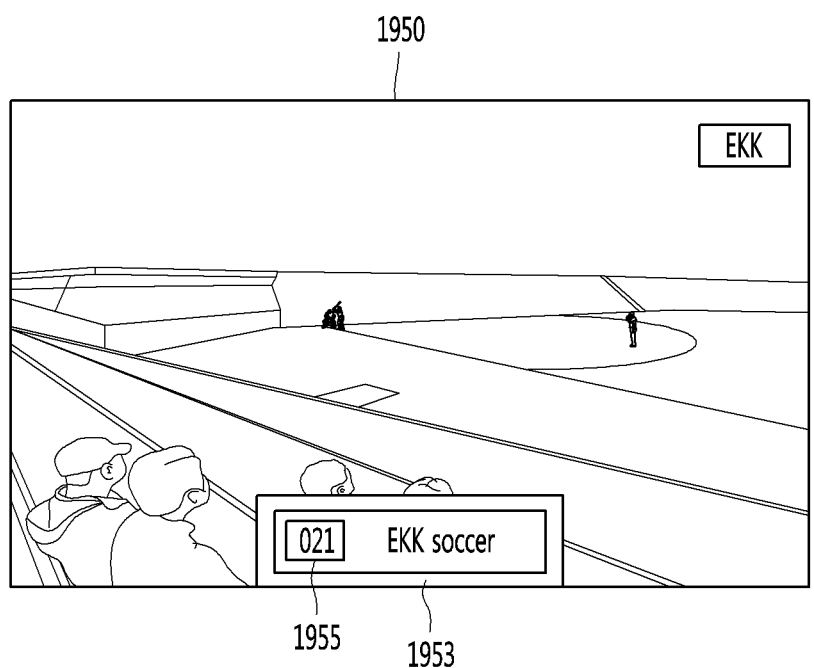

FIGS. 19A to 19C are views for describing different display positions of the channel number according to the type of the set-top box connected to the display device.

In FIG. 19A, a first set-top box is connected to the display device 100, and the display device 100 displays a first broadcast program image 1910 input from the first set-top box.

A first banner 1913 including the information on the first broadcast program image 1910 may be displayed on the first broadcast program image 1910 for a predetermined time. A first channel number 1915 of the first broadcast program image 1910 may be displayed on a first banner 1913.

In FIG. 19B, a second set-top box is connected to the display device 100, and the display device 100 displays a second broadcast program image 1930 input from the second set-top box.

A second banner 1933 including the information on the second broadcast program image 1930 may be displayed on the second broadcast program image 1930 for a predetermined time. A second channel number 1935 of the second broadcast program image 1930 may be displayed on a second banner 1933.

In FIG. 19C, a third set-top box is connected to the display device 100, and the display device 100 displays a third broadcast program image 1950 input from the third set-top box.

A third banner 1953 including the information on the third broadcast program image 1950 may be displayed on the third broadcast program image 1950 for a predetermined time. A third channel number 1955 of the third broadcast program image 1950 may be displayed on a third banner 1953.

The display position of the first channel number 1915 and the display positions of the second channel number 18=935 and the third channel number 1955 may be different from each other. This is because the display position of the banner including the channel number changes according to the type of the set-top box 500.

Therefore, if the type of the set-top box 500 or the version of the set-top box 500 changes, the channel number cannot be accurately recognized through the position information of the channel number acquired by the channel number recognition algorithm according to the embodiment of FIGS. 9 to 13.

According to another embodiment of the present disclosure, the display device 100 may receive position information of the channel number from an interworking server and automatically recognize the broadcast channel number provided from the set-top box 500.

Figure 20:
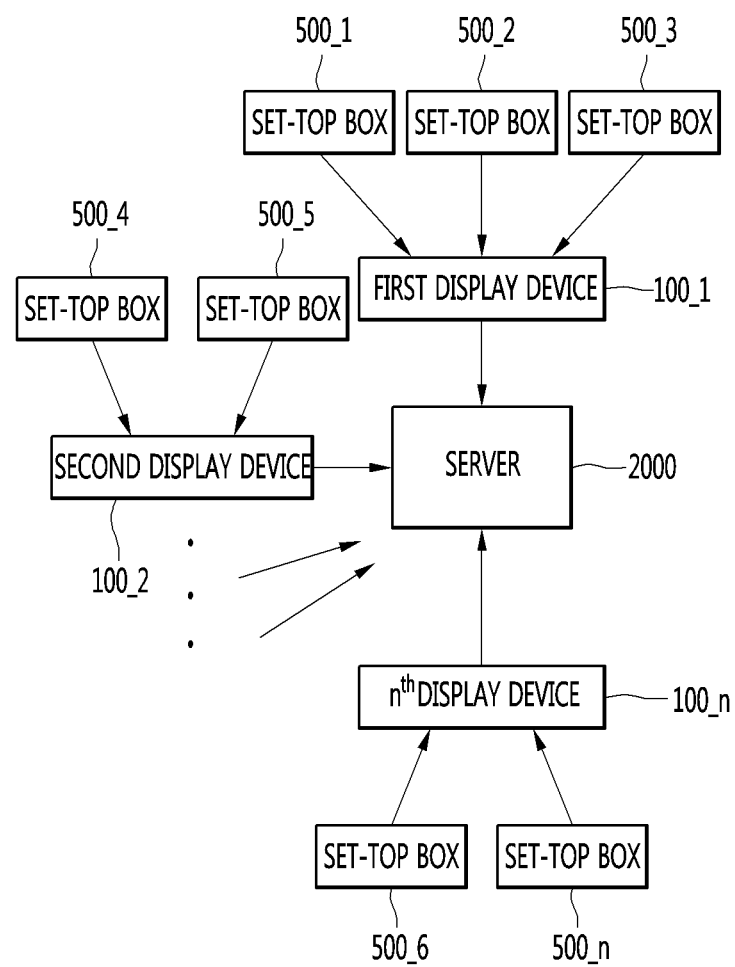
FIG. 20 is a block diagram of a display system according to another embodiment of the present disclosure.

FIG. 20 is a block diagram of a display system according to another embodiment of the present disclosure.

The display system according to another embodiment of the present disclosure may include a plurality of display devices 100_1 to 100_n, a plurality of set-top boxes 500_1 to 500_n, and a server 2000.

Each of the plurality of display devices 100_1 to 100_n may collect information on the connected set-top boxes.

For example, the first display device 100_1 may collect information on the set-top boxes 500_1 to 500_3.

The information of the set-top box 500 may include identification information of the set-top box 500, banner information input from the set-top box 500, and position information of the channel number of the broadcast image input from the set-top box 500.

The identification information of the set-top box 500 may be information for identifying the set-top box 500. The identification information of the set-top box 500 may include one or more of a name of the set-top box 500, a model name of the set-top box 500, and a version of the set-top box 500.

The banner information may include one or more of a time point if the banner input from the set-top box 500 is output (displayed) and a time point if the display of the banner is maintained. The banner output time point may be a time point if the banner is displayed through the display, after the broadcast channel is changed.

The position information of the channel number may include coordinates where the channel number of the changed broadcast channel is displayed, if the broadcast channel is changed. The display device 100 may acquire the position information of the channel number by using the channel number recognition algorithm according to the embodiment of FIGS. 9 to 13.

The channel number may be displayed on the banner, but this is merely an example. The channel number may be displayed at a predetermined point of the broadcast program image.

Each of the display devices 100 may transmit the collected information of the set-top boxes 500 to the server 2000.

If each of the display devices 100 is connected to the server 2000 through the network interface unit 144 shown in FIG. 1, each of the display devices 100 may transmit the collected information of the set-top boxes 500 to the server 2000.

The server 2000 may store the information collected from each of the plurality of display devices 100_1 to 100_n and generate a database.

If the server 2000 is connected to the display devices 100 through the network, the server 200 may transmit the generated database to the display devices 100.

Each of the display devices 100 may recognize the channel number of the broadcast channel input from the connected set-top boxes 500 by using the database received from the server 2000.

Specifically, each of the display devices 100 may acquire the position information of the channel numbers corresponding to the set-top boxes 500 connected to the display devices 100, which are included in the database.

Each of the display devices 100 may recognize the channel number by using the acquired position information of the channel number.

Each of the display devices 100 may display broadcasting information related to the recognized channel number.

Even if any type of the set-top box 500 is connected, each of the display devices 100 may quickly recognize the channel number of the broadcast image input from the connected set-top boxes 500 by using the database received from the server 2000, without a separate channel number recognition algorithm.

Figure 21:
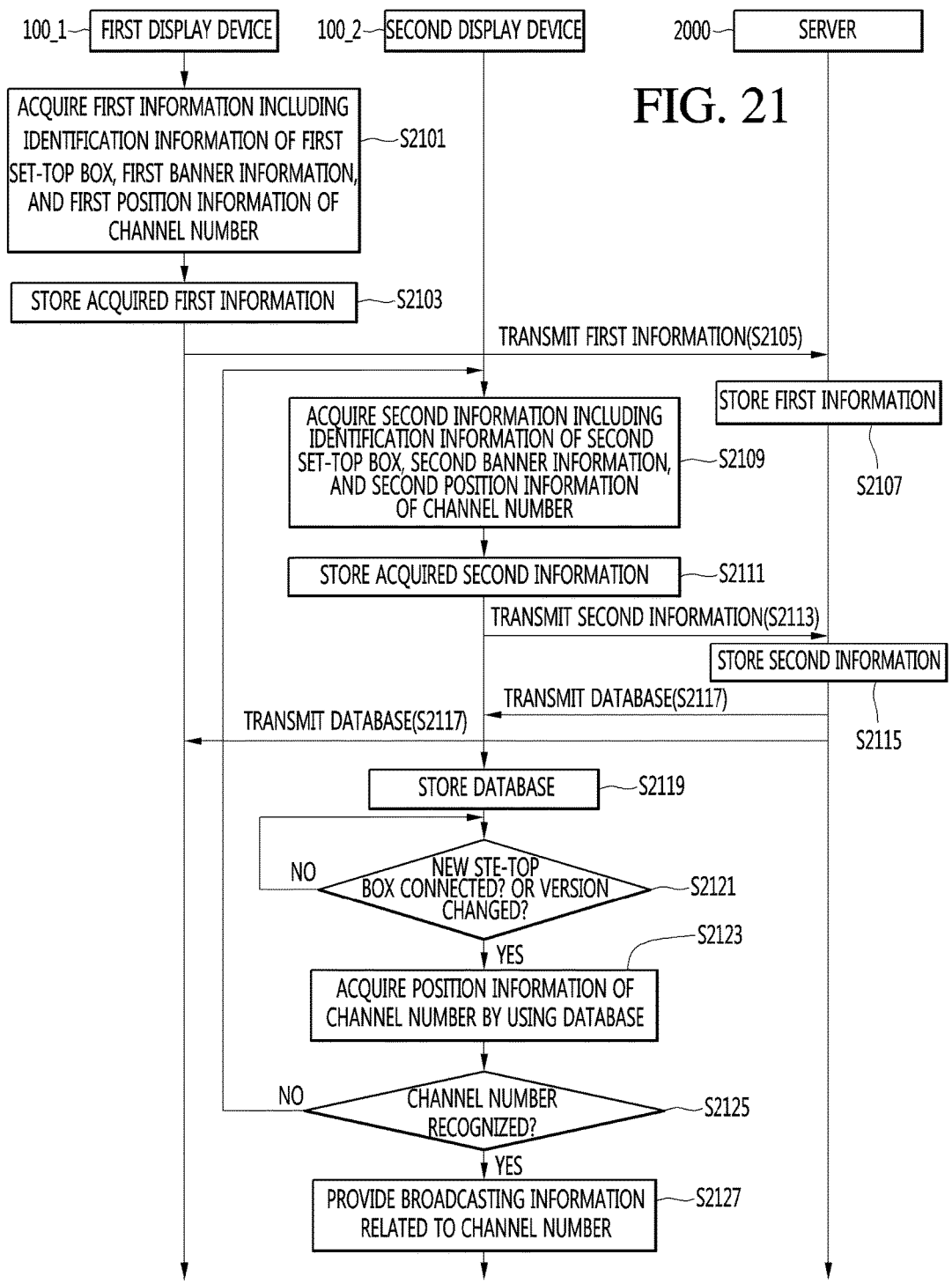
FIG. 21 is a ladder diagram of an operating method of a display system, according to an embodiment of the present disclosure.

FIG. 21 is a ladder diagram of an operating method of a display system, according to an embodiment of the present disclosure.

In the embodiment of FIG. 21, the use of the first display device 100_1 and the second display device 100_2 alone is shown, but this is merely an example. The present disclosure may also be applied to a case where three or more display devices exist.

Additionally, in another embodiment, the embodiment of FIG. 21 may be performed by using one display device 100. In this case, different types of set-top boxes are connected to the display devices 100 one by one, and the information of the connected set-top boxes may be transmitted to the server 2000.

Referring to FIG. 21, the control unit 170 of the first display device 100_1 acquires first information including identification information of the first set-top box, first banner information, and first position information of the channel number (S2101).

In one embodiment, the control unit 170 may acquire the identification information of the first set-top box from the first set-top box connected through the external device interface unit 135.

The identification information of the first set-top box may include one or more of a type of the first set-top box, a model of the first set-top box, and a version of the first set-top box.

The control unit 170 may acquire first banner information based on the banner input from the first set-top box. The first banner information may include one or more of a banner output time point necessary until the banner is displayed and a banner retention time in which the display of the banner is maintained.

The control unit 170 may identify the banner by using the broadcast program image and the banner input from the first set-top box. The example of identifying the banner is the same as described with reference to FIG. 17.

The control unit 170 may acquire the position information of a position where the channel number of the broadcast channel input from the first set-top box is displayed.

The control unit 170 may acquire the coordinates of the channel number by using the channel number recognition algorithm according to the embodiment of FIGS. 9 to 13. According to another embodiment, if two channel numbers are displayed, the control unit 170 may acquire coordinates of each of the two channel numbers.

The control unit 170 of the first display device 100_1 stores the acquired first information in the storage unit 140 (S2103).

The control unit 170 of the first display device 100_1 transmits the first information to the server 2000 connected to the network through the network interface unit 133 (S2105).

The control unit 170 may transmit, to the server 2000, the first information including the identification information of the first set-top box, the first banner information, and the first position information of the channel number.

In one embodiment, the control unit 170 may collect the first information in a state of not being connected to the network. If the control unit 170 is connected to the server 2000 through the network interface unit 133, the control unit 170 may transmit the collected first information to the server 2000.

If a new set-top box is connected, the control unit 170 may transmit first information of the new set-top box to the server 2000.

The server 2000 stores the first information received from the first display device 100_1 (S2107).

On the other hand, the second display device 100_2 also performs the same process as in operations S2101 to S2105.

That is, the control unit 170 of the second display device 100_2 acquires second information including identification information of the second set-top box, second banner information, and second position information of the channel number (S2109).

The control unit 170 of the second display device 100_2 stores the acquired second information in the storage unit 140 (S2111).

The control unit 170 of the second display device 100_2 transmits the second information to the server 2000 connected to the network through the network interface unit 133 (S2113).

The server 2000 stores the second information received from the second display device 100_2 (S2115).

The server 2000 may establish a database by using the first information received from the first display device 100_1 and the second information received from the second display device 100_2.

This will be described below with reference to FIG. 22.

FIG. 22 is a view for describing a database established using set-top box information collected from a plurality of display devices, according to an embodiment of the present disclosure.

The database 2200 may include a type 2210 of the set-top box, first position information 2220 of the channel number, second position information 2230 of the channel number, a banner output time point 2240, a version 2250 of the set-top box, and channel number recognition algorithm type information 2260.

The database 2200 may include a correspondence relationship between the position information of the channel number, the banner output time point, the version of the set-top box, and the channel number recognition algorithm type information according to the type of the set-top box.

The type 2210 of the set-top box may represent a manufacturer supplying the set-top box 500 or a model of the set-top box 500.

The first position information 2220 of the channel number may represent first coordinates where the channel number is displayed in the broadcast program image input from the set-top box 500. The first coordinates may include xy coordinates of a region where the channel number is displayed, a width of the region where the channel number is displayed, and a height of the region where the channel number is displayed.

The second position information 2230 of the channel number may represent second coordinates where the channel number is displayed in the broadcast program image input from the set-top box 500. The second coordinates may include xy coordinates of a region where the channel number is displayed, a width of the region where the channel number is displayed, and a height of the region where the channel number is displayed.

The banner output time point 2240 may represent the time necessary until the banner is displayed after the broadcast channel is changed.

The version 2250 of the set-top box may represent the number of times of updates of the set-top box.

The channel number recognition algorithm type information 2260 may be information indicating the type of the channel number recognition algorithm that the display device 100 uses to recognize the channel number.

To this end, if transmitting the position information of the channel number, each of the display devices 100 may transmit, to the server 2000, a flag indicating which type of the channel number recognition algorithm has been used.

The channel number recognition algorithm may be the region division and recognition method according to the embodiment of FIGS. 9 to 13, and the channel number may be recognized by other methods.

Again, FIG. 21 is described.

The server 2000 transmits the database 2200 to the first display device 100_1 and the second display device 100_2 (S2117).

In one embodiment, the server 2000 may periodically transmit the database 2200 to the first display device 100_1 and the second display device 100_2.

In another embodiment, if an information request is received from each of the display devices 100, the server 2000 may transmit the database 2200 to the corresponding display device 100.

In further another embodiment, if the set-top box 500 is connected to the display device 100, the server 2000 may transmit the database 2200 to the display device 100.

The storage unit 140 of the second display device 100_2 stores the database received from the server 2000 (S2119).

The control unit 170 of the second display device 100_2 checks whether a new set-top box 500 is connected or the version of the set-top box 500 has changed (S2121).

The control unit 170 may check whether another set-top box, not the existing connected second set-top box, is connected through the external device interface unit 135.

In the embodiment of the present disclosure, it has been assumed that a different type of a set-top box is newly connected, but embodiments of the present disclosure are not necessarily limited thereto.

That is, since the version may be changed even with respect to the same type of set-top boxes, the control unit 170 may check whether the version of the set-top box has been changed.

The control unit 170 may receive the identification information of the set-top box 500 from the connected set-top box 500 and check whether a new set-top box 500 is connected or the version of the set-top box 500 has been changed, by using the received identification information.

If the new set-top box is connected, the control unit 170 of the second display device 100_2 acquires the position information of the channel number by using the stored database (S2123).

The control unit 170 may acquire the identification information of the set-top box from the newly connected set-top box.

The control unit 170 may extract the position information of the channel number from the previously stored database by using the acquired identification information of the set-top box.

For example, if the type of the newly connected set-top box is A (see FIG. 22), the control unit 170 may acquire the position information of the channel number corresponding to the set-top box A from the database 2200.

The control unit 170 of the second display device 100_2 checks whether the channel number of the broadcast image input from the currently connected set-top box has been recognized, by using the acquired position information of the channel number (S2125).

The control unit 170 may recognize the channel number located in the corresponding position within the broadcast image by using the position information of the channel number acquired from the database, without driving a separate channel number recognition algorithm.

Even if the broadcast channel is changed, the control unit 170 may automatically recognize the channel number by using the previously acquired position information of the channel number.

If the channel number is recognized, the control unit 170 of the second display device 100_2 provides broadcasting information related to the recognized channel number (S2127).

That is, even if the new set-top box is connected or the version of the set-top box is changed, the control unit 170 may automatically recognize the channel number by using the stored database, without driving a separate channel number recognition algorithm.

Accordingly, the time necessary for driving the channel number recognition algorithm can be reduced and the user can quickly receive the related broadcasting information.

Additionally, it is possible to improve the reliability and accuracy for the position of the channel number through the database.

If the channel number is not recognized through the position information of the channel number, the control unit 170 of the second display device 100_2 performs operation S2109.

If the channel number is not recognized through the position information of the channel number, the control unit 170 of the second display device 100_2 may perform the process of acquiring the position information of the channel number again through the channel number recognition algorithm.

That is, the control unit 170 may acquire the position information of the channel number through the channel number recognition algorithm according to the embodiment of FIGS. 9 to 13, and may transmit the acquired position information to the server 2000.

If a new set-top box is connected to the display device 100, the server 2000 may not store the position information of the channel number corresponding to the new set-top box. In this case, the display device 100 may acquire the position information of the channel number through the channel number recognition algorithm, and the server 2000 may store the position information of the channel number corresponding to the relevant set-top box in association with the position information of the channel number.

In this manner, the server 2000 may continuously update the database 2200.

FIG. 23 is a view for describing an example of recognizing a channel number of a current on-air broadcast program and providing broadcasting information related to the recognized channel number, according to another embodiment of the present disclosure.

Referring to FIG. 23, the display device 100 displays a first broadcast program image 1910 input from a connected set-top box 500.

A name 1911 of a first broadcasting company providing the first broadcast program image 1910 may be displayed on the first broadcast program image 1910.

The control unit 170 may change the broadcast channel in response to a broadcast channel change request. Accordingly, the control unit 170 may change the first broadcast program image 1910 to a second broadcast program image 2310.

Simultaneously, the control unit 170 may display a banner 2303 including information on the second broadcast program image 2310. The banner 2303 may be displayed after 0.3 seconds from the broadcast channel change, but this is merely an example.

The banner 2303 may include a channel number 2307 of the second broadcast program image 2310 and a title of the second broadcast program image 2310.

The display device 100 may receive the database 2200 shown in FIG. 22 from the server 2000 and store the received database 2200.

If the broadcast channel is changed, the control unit 170 of the display device 100 may extract the position information of the channel number stored in the storage unit 140. The control unit 170 may recognize the channel number 2307 within the second broadcast program image 2300 y using the extracted position information of the channel number.

The control unit 170 may acquire the broadcasting information related to the recognized channel number 2307 by using an EPG.

The control unit 170 may display the broadcasting information 2320 related to the recognized channel number within the second broadcast program image 2301.

The related broadcasting information 2320 may include one or more of information on persons appearing in the second broadcast program image 2300 and story information of the second broadcasting program image 2300.

The control unit 170 may transmit the related broadcasting information to a user's mobile terminal such as a mobile phone or a watch-type mobile terminal.

The control unit 170 may further display a broadcasting information icon 2310 for providing the broadcasting information related to the recognized channel number 2307. The broadcasting information icon 2310 may be an icon for providing a previous episode of the second broadcast program image 2300 corresponding to the recognized channel number 2307.

The broadcasting information icon 2310 may include a name of a content provider that can provide the previous episode of the second broadcast program image 2300, but this is merely an example.

The broadcasting information icon 2310 may be displayed on the banner 2310, but this is merely an example.

The broadcasting information icon 2310 may be located within a region where the related broadcasting information 2320 is displayed.

In another embodiment, the broadcasting information icon 2310 may be displayed on the banner 2303, and then, if the banner 23030 disappears, may be moved to the region where the related broadcasting information 2320 is displayed.

On the other hand, the control unit 170 may change the related broadcasting information according to the setting. For example, if the setting for providing the related broadcasting information according to the channel number recognition is turned on, the control unit 170 may recognize the channel number changed according to the channel change and provide the related broadcasting information.

If the setting for providing the related broadcasting information according to the channel number recognition is turned off, the control unit 170 may not recognize the changed channel number and thus may not provide the related broadcasting information.

According to various embodiments of the present disclosure, it is possible to quickly recognize the channel number of the broadcast program provided from the set-top box connected to the display device.

Additionally, according to various embodiments of the present disclosure, the user can receive a variety of broadcasting information, such as broadcast program information, channel recommendation information that can be provided by the TV itself, or the like, by using the recognized channel number.

According to an embodiment, the above-described method may also be embodied as processor-readable codes on a program-recordable medium. Examples of the processor-readable medium may include a ROM, a RAM, a CD-ROM, a magnetic tape, a floppy disk, and an optical data storage device.

The above-described display device is not limited to the configuration and method of the above-described embodiments, and some or all of the embodiments may also be selectively combined and configured to provide various modifications.

What is claimed is:

1. A display device comprising:
   a memory;
   a display unit;
   a user interface unit to communicate with a remote controller;
   an external device interface unit to receive an image signal from a set-top box connected to the display device; and
   a control unit to:
   receive a request for changing a broadcast channel from the remote controller,
   recognize the broadcast channel change according to the request,
   display a broadcast image of the changed broadcast channel based on the image signal received from the set-top box,
   capture the broadcast image from a time point when the broadcast channel is changed,
   determine whether the captured broadcast image includes a main banner in a same position as a previous broadcast channel,
   recognize a channel number of the broadcast image by using the main banner included in the captured broadcast image when the main banner is located in the same position as a position of a main banner of the previous broadcast channel, and
   display, on the display unit, broadcasting information related to the recognized channel number,
   determine whether a version of the set-top box connected to the display device has been changed, acquire position information of the channel number corresponding to the version of the set-top box from the memory if the version of the set-top box has been changed, and
   recognize the channel number using the position information of the channel number.

2. The display device of claim 1, wherein, when the broadcast channel is changed again, the control unit recognizes a channel number of the changed broadcast channel by using the stored position information.

3. The display device of claim 1, wherein the control unit divides the displayed broadcast image into a plurality of regions, acquires the number of characters in the plurality of divided regions, recognizes a text in each region when the number of characters in each region is equal to or less than a reference number, registers the corresponding region as a candidate group when the recognized text is valid, acquires coordinates of the region registered as the candidate group, and acquires the acquired coordinates as the position information of the channel number.

4. The display device of claim 3, wherein, when the text in each region includes a number alone, the control unit determines that the recognized text is valid.

5. The display device of claim 4, wherein, when a plurality of candidate groups are registered, the control unit filters the plurality of candidate groups based on information of each candidate group, and when one candidate group remains as a result of the filtering, the control unit acquires coordinates of the remaining candidate group as the position of the channel number.

6. The display device of claim 5, wherein the information of each candidate group includes one or more of coordinate information of each candidate group, a length of a text included in each candidate group, and a text size.

7. The display device of claim 6, wherein the control unit selects a candidate group having a largest text size as a final candidate group among the plurality of registered candidate groups, and acquires coordinates of the selected final candidate group as the position information of the channel number.

8. The display device of claim 1, wherein the control unit displays the broadcasting information related to the recognized channel number by using electronic program guide (EPG) information received from the set-top box, and the broadcasting information includes one or more of a channel recommendation, information on the broadcast image, and a genre of the broadcast image.

9. The display device of claim 1, wherein the control unit acquires a sub-banner from the captured broadcast image when the main banner is not located in the same position as the position of the main banner of the previous broadcast channel, and recognizes the channel number by using the sub-banner.

* * * * *